(12) United States Patent
Beland

(10) Patent No.: US 7,928,664 B2
(45) Date of Patent: Apr. 19, 2011

(54) ILLUMINATION SYSTEMS

(75) Inventor: Robert Beland, St. Marthe sur le Lac (CA)

(73) Assignee: EMD Technologies, Inc., Saint-Eustache, Quebec (CA)

( * ) Notice: Subject to any disclaimer, the term of this patent is extended or adjusted under 35 U.S.C. 154(b) by 1003 days.

(21) Appl. No.: 11/786,060

(22) Filed: Apr. 10, 2007

(65) Prior Publication Data

US 2007/0236159 A1    Oct. 11, 2007

Related U.S. Application Data

(60) Provisional application No. 60/790,627, filed on Apr. 10, 2006.

(51) Int. Cl.
*H05B 41/16* (2006.01)
(52) U.S. Cl. ........ 315/276; 315/312; 315/291; 315/244; 336/119; 336/145; 336/173
(58) Field of Classification Search .......... 315/291, 315/292, 294, 307, 312, 276, 209 R, 244, 315/247; 336/117, 119, 145, 172, 173, 177
See application file for complete search history.

(56) References Cited

U.S. PATENT DOCUMENTS

| | | | |
|---|---|---|---|
| 3,708,739 A | 1/1973 | Kohler | 363/57 |
| 4,132,925 A | 1/1979 | Schmutzer et al. | 315/208 |
| 4,259,616 A | 3/1981 | Smith | 315/256 |
| 4,641,061 A | 2/1987 | Munson | 315/210 |
| 4,751,398 A | 6/1988 | Ertz, III | 307/66 |
| 4,797,801 A | 1/1989 | Furuhashi | 363/43 |
| 4,802,079 A | 1/1989 | Mizoguchi | 363/43 |
| 4,904,904 A | 2/1990 | Zarate | 315/219 |
| 4,967,333 A | 10/1990 | Callier et al. | 363/17 |
| 5,023,769 A | 6/1991 | Beland | 363/86 |
| 5,056,125 A | 10/1991 | Beland | 378/101 |
| 5,241,260 A | 8/1993 | Beland | 323/270 |
| 5,367,448 A * | 11/1994 | Carroll | 363/89 |
| 5,388,139 A | 2/1995 | Beland | 378/112 |
| 5,391,977 A | 2/1995 | Beland | 323/268 |
| 5,416,388 A | 5/1995 | Shackle | 315/219 |
| 5,420,482 A * | 5/1995 | Phares | 315/292 |
| 5,495,165 A | 2/1996 | Beland | 323/270 |

(Continued)

FOREIGN PATENT DOCUMENTS

GB    2114385    8/1983

(Continued)

OTHER PUBLICATIONS

"Retrofit and Installation instructions," Permlight Products, Tustin, CA 92780 (8 pages) Mar. 26, 2004.
Twiste'R PL725 Series Datasheet, Permlight Products, Tustin, CA 92780.
"LINEARlight Connector Systems", Product Information Bulletin OSRAM SYLVANIA Westfield, IN 46074 (2 pages).

(Continued)

*Primary Examiner* — Haissa Philogene
(74) *Attorney, Agent, or Firm* — Ivan David Zitkovsky

(57) ABSTRACT

An illumination system includes a master power supply providing power to several illumination modules. The master power supply is constructed and arranged to generate high-frequency and low-voltage electrical power provided to a primary wire forming a current loop. Each illumination module includes an electromagnetic coupling element and several light sources. The electromagnetic coupling element includes a magnetic core arranged to receive the current loop in a removable arrangement, and a secondary wire wound around the magnetic core to enable inductive coupling. The secondary wire is connected to provide current to the light sources that may be arranged in the illumination module as a DC load or an AC load.

41 Claims, 24 Drawing Sheets

U.S. PATENT DOCUMENTS

| | | | | |
|---|---|---|---|---|
| 5,559,686 | A | 9/1996 | Patel et al. | 363/43 |
| 5,566,443 | A | 10/1996 | Allan et al. | 29/605 |
| 5,594,433 | A | 1/1997 | Terlep | 340/908.1 |
| 5,621,281 | A | 4/1997 | Kawabata et al. | 315/311 |
| 5,661,774 | A | 8/1997 | Gordon et al. | 378/101 |
| 5,814,938 | A | 9/1998 | Beland et al. | 315/3 |
| 5,966,425 | A | 10/1999 | Beland | 378/108 |
| 6,111,367 | A | 8/2000 | Asano et al. | 315/291 |
| 6,111,732 | A | 8/2000 | Beland | 361/42 |
| 6,118,227 | A | 9/2000 | Beland | 315/276 |
| 6,144,170 | A | 11/2000 | Beland et al. | 315/276 |
| 6,285,140 | B1 * | 9/2001 | Ruxton | 315/312 |
| 6,351,079 | B1 | 2/2002 | Willis | 315/200 A |
| 6,424,098 | B1 | 7/2002 | Beland et al. | 315/224 |
| 6,538,394 | B2 | 3/2003 | Volk et al. | 315/291 |
| 6,578,986 | B2 | 6/2003 | Swaris et al. | 362/249 |
| 6,618,031 | B1 | 9/2003 | Bohn, Jr. et al. | 345/83 |
| 6,693,556 | B1 | 2/2004 | Jones et al. | 340/907 |
| 6,712,486 | B1 | 3/2004 | Popovich et al. | 362/249 |
| 6,791,283 | B2 * | 9/2004 | Bowman et al. | 315/291 |
| 6,846,093 | B2 | 1/2005 | Swaris et al. | 362/249 |
| 6,853,151 | B2 * | 2/2005 | Leong et al. | 315/185 R |
| 6,932,495 | B2 | 8/2005 | Sloan et al. | 362/294 |
| 6,956,494 | B2 | 10/2005 | Tichborne et al. | 340/815.45 |

FOREIGN PATENT DOCUMENTS

WO    WO 97/38479    10/1997

OTHER PUBLICATIONS

"LINEARlight LED Modules," Product Information Bulletin, OSRAM SYLVANIA Westfield, IN 46074 (2 pages).

"BACKlight 2G BL02 LED," Modules Product Information Bulletin, OSRAM SYLVANIA Westfield, IN 46074 (5 pages).

"ChanneLED 4 Great White" SloanLED, Ventura, CA 93003 www.SloanLED.com (7 pages) Mar. 25, 2004.

"ChanneLED 4 Channel Letter" LEDs SloanLED, Ventura, CA 93003 www.SloanLED.com Jul. 15, 2005 (2 pages).

TETRA LED Systems, "LED Illuminations for Signage and Architecture," GELcore Valley View, OH 44125 www.gelcore.com 2006 (3 pages).

PaletteLight PL780-MINI Datasheet, Permlight Products, Tustin, CA 92780.

Tetra BT LED Border Tube Systems, GELcore Valley View, OH 44125 www.gelcore.com 2006.

"Quadrand & BiMod LED Lighting Systems," ACTOWN, Sign Products Group Spring Grove, IL 60081 www.actowm.com Mar. 2004 (4 pages).

Channel Letter Module Power Supply Installation Instructions France a Scott Fetzer Company, Fairview, TN 37062.

France LED Channel Letter Module Power Supply, Models CLM-1250 & LPS-1250, France a Scott Fetzer Company, Fairview, TN 37062 (2 pages).

"LED Modules link together for signs and displays" Ledtronics Inc. www.ledtronics.com Jul. 20, 2005.

Quadrand & BiMod LED Lighting Systems, ACTOWN, Sign Products Group Spring Grove, IL 60081 www.actowm.com.

"Channel Letter Module and Power Supply Installation Instructions" France a Scott Fetzer Company, Fairview, TN 37062.

* cited by examiner

ILLUMINATION SYSTEMS

This application claims priority from U.S. Provisional Application 60/790,627, entitled Illumination Systems, filed on Apr. 10, 2006, which is incorporated by reference.

BACKGROUND OF THE INVENTION

The present invention relates to illumination systems and methods, and more particularly, to illumination systems and methods for general lighting and commercial signs.

Commercial lighting systems, used on the outside of commercial buildings for advertising purposes, include channel letters. Channel letters generally include a housing with a concave cross-section about 5" deep, made of aluminum or plastic. The housing cavity, shaped as the letter, is covered by a translucent plastic sheet of a selected color, illuminated by a light source mounted within. Neon and fluorescent lights provide suitable illumination, allowing the letters to shine brightly when turned on. However, fluorescent light sources have a relatively short life of approximately 20,000 hours. They operate at high voltage (for example, 7,000 to 15,000 volts for neon) and can consume a relatively large amount of electrical power. Furthermore, fluorescent light tubes are usually quite fragile. Still, fluorescent lights have been used for decades and decades in different fields.

Light emitting diodes (LEDs) are currently used for a wide range of applications, providing a variety of advantages relative to conventional lights, such as neon or fluorescent bulbs, due to their advantageous qualities. LEDs are compact, rugged, and consume less power, being 30 to 70% more energy efficient than conventional lights. LEDs have a relatively long life of up to 100,000 hours and operate at low voltages (4 VDC to 24 VDC).

FIG. 1 shows an example of an illuminating system as used presently for general lighting and commercial sign lighting systems. The illumination system includes a DC power supply usually connected to 120 VAC. The output from the power supply provides DC voltage (from 4 to 24 VDC) to a supply rail providing electrical connection to LED arrays arranged in several illumination modules. These modules are usually connected in parallel on a DC supply bus. The LEDs are connected with wires that are soldered permanently at a fixed spacing; that is, use fixed electrical wiring. Every single illumination module is connected to the next module using two or four wires (i.e., positive and negative inputs and outputs) by mechanically creating electrical contact. Each LED module uses a ballast resistor R (or regulator) to provide a constant current to the LEDs connected in series since LEDs operate with current (and not voltage). The modules are usually located inside a letter channel. This dissipative method normally uses as much energy in the ballast resistor (i.e., dissipated energy) as in the LEDs, resulting in efficiencies frequently lower than 50%. This means there is more energy wasted in heat than energy used by the LEDs to produce light.

The brightness of an LED depends upon the amount of electrical current flowing through the diode. However, while an increase in current increases the brightness of the light emitted by the LED, it also increases the connection temperature, which can decrease the LEDs efficiency and life. Given that LEDs are often constructed of semiconductor materials that share many comparable properties with silicon and gallium arsenide, this can be highly detrimental. As a case in point, for every 10° C. increase in temperature, the useful life of silicon and gallium arsenide drops 2.5-3 times.

The conventional light circuits can be prone to problems other than those described above. The system of FIG. 1 includes modules joined with connectors, which are prone to reliability troubles. For example, connectors can fail due to corrosion, and many devices, as well as commercial lighting systems, are used outdoors. Also, while diodes are generally biased through a series resistor from a regulated voltage supply, the amount of current going through the diode depends also on the forward voltage drop over the diode, which drops with changes in its size, age, and its temperature at the time.

The LEDs have been also used as light sources in applications such as emergency EXIT signs. The EXIT signs contain a reflector in the rear, having a series of curved, concave surfaces shaped as letters and background area. The LEDs are mounted in the center of each surface to provide light that is projected outwardly.

There is still a need for an improved illumination system that is simple and quick to install and that operates at relatively high power efficiency.

SUMMARY OF THE INVENTION

The present invention relates to illumination systems and methods for general lighting and commercial signs. The illumination system includes a master power supply providing power to several illumination modules. The master power supply is constructed and arranged to generate high-frequency and low-voltage electrical power provided to a primary wire forming a current (current-carrying) loop. Each illumination module includes an electromagnetic coupling element and several light sources. The electromagnetic coupling element includes a magnetic core arranged to receive the current loop in a removable arrangement, and a secondary wire wound around the magnetic core to enable inductive coupling. The secondary wire is connected to provide current to the light sources.

Preferred embodiments include one or several of the following features: The magnetic core and a part of the secondary wire wound around the core are encapsulated, thereby sealing the core and wire portion while enabling displacement of the primary wire with respect to the encapsulated ferromagnetic core. The magnetic core may be made of a ferromagnetic material, a ferrite, or a soft ferrite.

The magnetic core is ring-shaped and the secondary wire is wound around at least a portion of the ring-shaped core. The primary wire is threaded through an opening in the ring-shaped core. The illumination system includes low voltage or medium voltages light sources. Preferably, the illumination system includes light emitting diodes or incandescent lights.

Alternatively, the magnetic core has a rectangular shape, and the secondary wire is wound around at least a portion of the rectangularly-shaped core. The primary wire is threaded through an opening in the rectangularly-shaped core. The illumination system includes light sources that are preferably light emitting diodes (LEDs).

Alternatively, the magnetic core is shaped to include a closed magnetic path, and wherein the secondary wire is wound around at least a portion of the core to provide electromagnetic coupling. The primary wire is located inside the core and arranged to provide electromagnetic coupling.

The illumination system includes a master power supply that includes a resonant inverter. Preferably, the inverter provides an output in the range of about 20 kHz to about 40 kHz. Preferably, the master power supply includes a self-oscillating inverter providing substantially a sine wave output.

According to another embodiment, an electromagnetic coupling element is used with an illumination system. The coupling element is constructed to couple inductively power from a power supply to one or multiple light sources. The coupling element includes a magnetic core, a source wire wound around at least a portion of the magnetic core and being connected to at least one light source, and a casing surrounding the magnetic core and the source wire at the portion being wound around the magnetic core to electrically insulate the source wire and the magnetic core. The coupling element also includes an inductive region defined by the magnetic core and arranged to receive a conductor in a removable arrangement with respect to the magnetic core, the conductor being located to couple inductively power from a power supply to the source wire.

According to yet another embodiment, a master power supply is designed for an illumination system. The master power supply includes a resonant inverter, an AC current source, and a transformer. The resonant inverter is constructed and arranged to generate a high-frequency and low-voltage electrical output. The AC current source includes an inductor connected to receive the electrical output. The transformer has a primary side and a secondary side, wherein the primary side is connected to the current source and the secondary side is arranged to provide current to an illumination module that includes several light emitting diodes (LEDs).

Preferably, the master power supply includes a microcontroller. The master power supply can include a power factor corrector, a pulse width modulation (PWM) line regulator a loop current sensor, or an open circuit voltage sensor.

According to yet another embodiment, an illumination method includes generating high-frequency and low-voltage electrical power; providing the high-frequency and low-voltage electrical power to a primary wire forming a current loop; coupling energy from the current loop in a contactless manner to a secondary wire; and delivering current from the secondary wire to several light emitting diodes (LEDs).

Preferably, the illumination method includes controlling the high-frequency and low-voltage electrical power, and/or sensing a loop current by monitoring output of the high-frequency and low-voltage electrical signal, and/or sensing an open voltage current.

According to yet another embodiment, in an illumination system, an installation method is used for contactless coupling one or several illumination modules to a power supply. The illumination system comprises a master power supply constructed and arranged to provide electrical power to a primary wire forming a current loop; and an illumination module including an electromagnetic coupling element and several light sources. The electromagnetic coupling element includes a magnetic core. The method includes positioning one or several of the illumination modules constructed to provide light; and positioning the primary wire in a close proximity to the illumination module without establishing an electrical connection, the positioning enabling inductive power transfer from the primary wire to a secondary wire wound around at least a portion of the ferromagnetic core, wherein the secondary wire is connected to provide current to one or multiple light sources.

The described illumination system has numerous advantages: There is no need to establish electrical contact or connection to any of the illumination modules, thus increased reliability, lower cost, not position dependent. The system has high efficiency (relatively low power consumption by the elimination of the ballast resistor used for LEDs in prior art systems. There is only one wire used for powering the illumination modules instead of two or four wires in the prior art illuminations systems. Quick and easy installation since there is no polarity because of using alternating current provided by the master power supply. The system can be truly waterproof when the illumination module is encapsulated since there is no connection to the outside world. This provides greater installation safety due to the absence of voltage nearby which prevents accidental contact, and since there is no touchable connection or soldering accessible.

Further features and advantages of the present invention as well as the structure and method of various embodiments of the present invention are described herein in detail below, with reference to the accompanying drawings.

DETAILED DESCRIPTION OF THE PREFERRED EMBODIMENT

Figure 1:
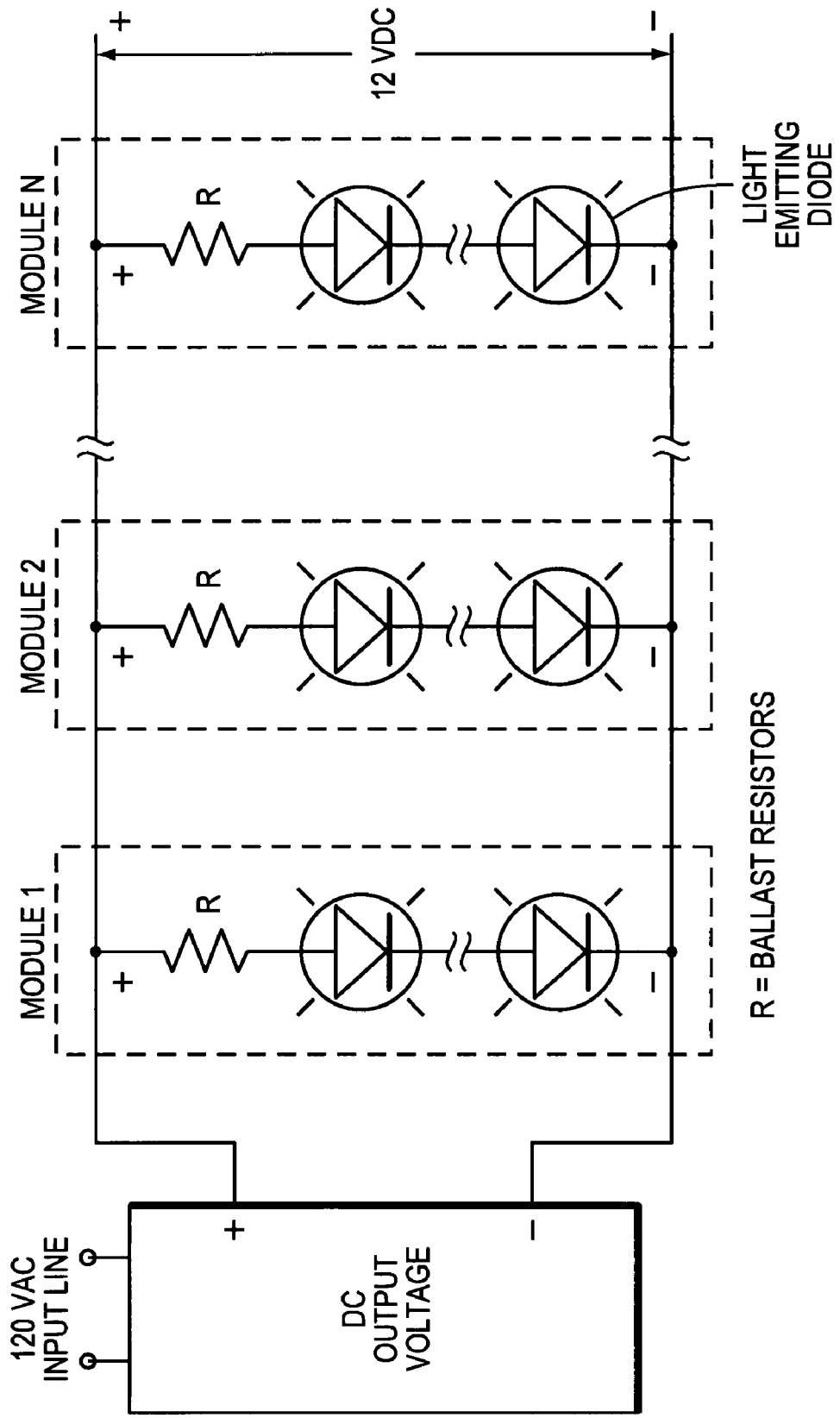
FIG. 1 illustrates an illumination system for general lighting and commercial sign illumination, according to prior art.
Figure 2:
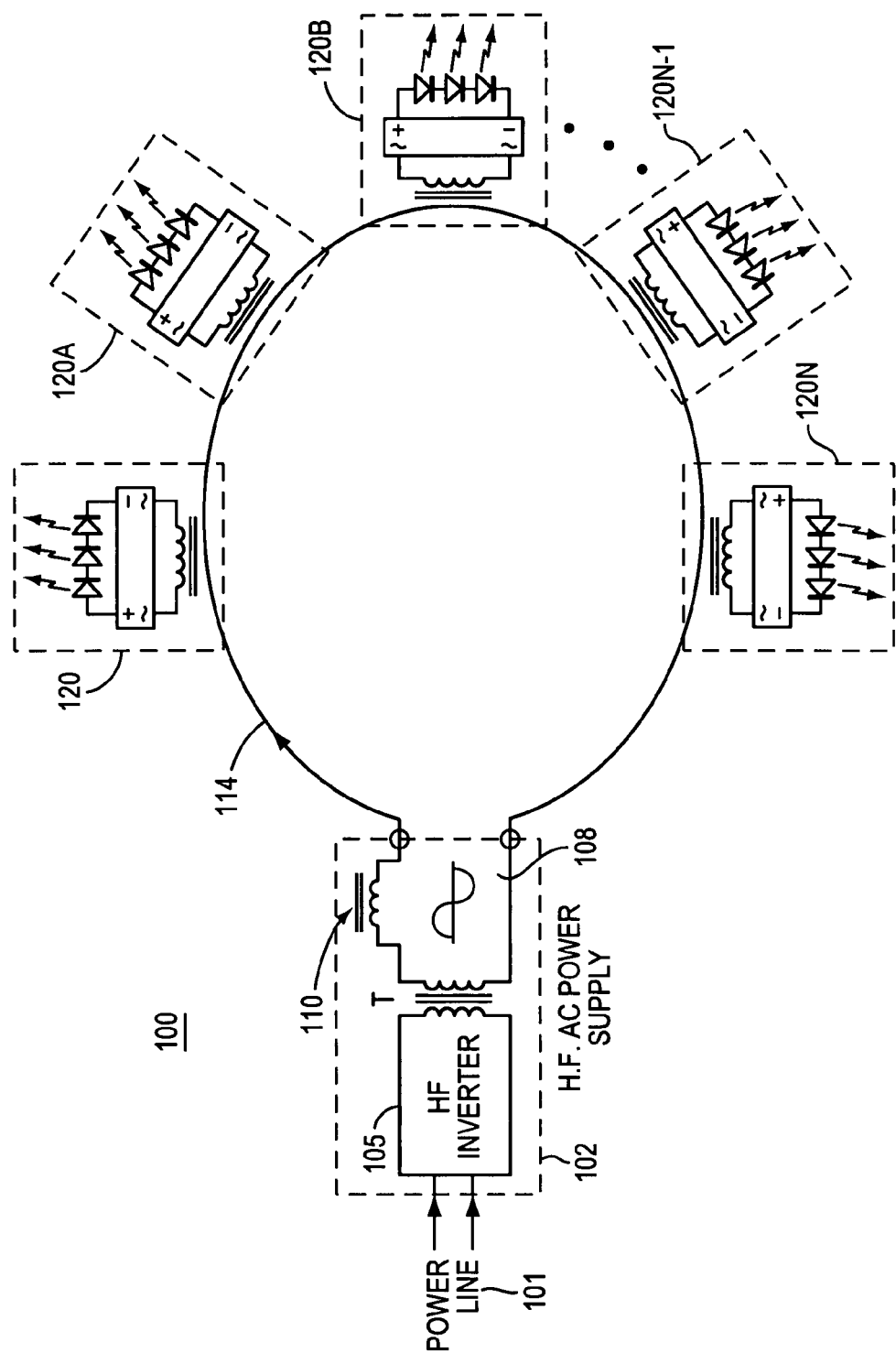
FIG. 2 illustrates an illumination system including a high frequency power supply and several illumination modules.

FIG. 2 illustrates an illumination system 100 suitable for general lighting and illumination of commercial signs. Illumination system 100 includes a high frequency power supply 102 powered by a power line 101 (for example, 110V and 50 Hz or 220 V and 60 Hz). High frequency power supply 102 includes a high frequency (HF) inverter 105 and a current source 108 including a current limiter 110. HF inverter 105 provides a sinusoidal signal of a frequency in the range of 5 kHz to 100 kHz, and preferably in the range of 20 kHz to 40 kHz to transformer T. The output from illumination system 100 is provided to a primary current loop 114. Several illumination modules 120, 120A, 120B . . . 120N are coupled to illumination system 100 using current loop 114. Each illumination module 120 includes an electromagnetic coupling element (shown in detail in FIG. 4B and also shown in FIGS. 2, 2A and 4A) and several light sources that are preferably light emitting diodes (LEDs). In general, the light sources are low voltage or medium voltage light sources.

Figure 2A:
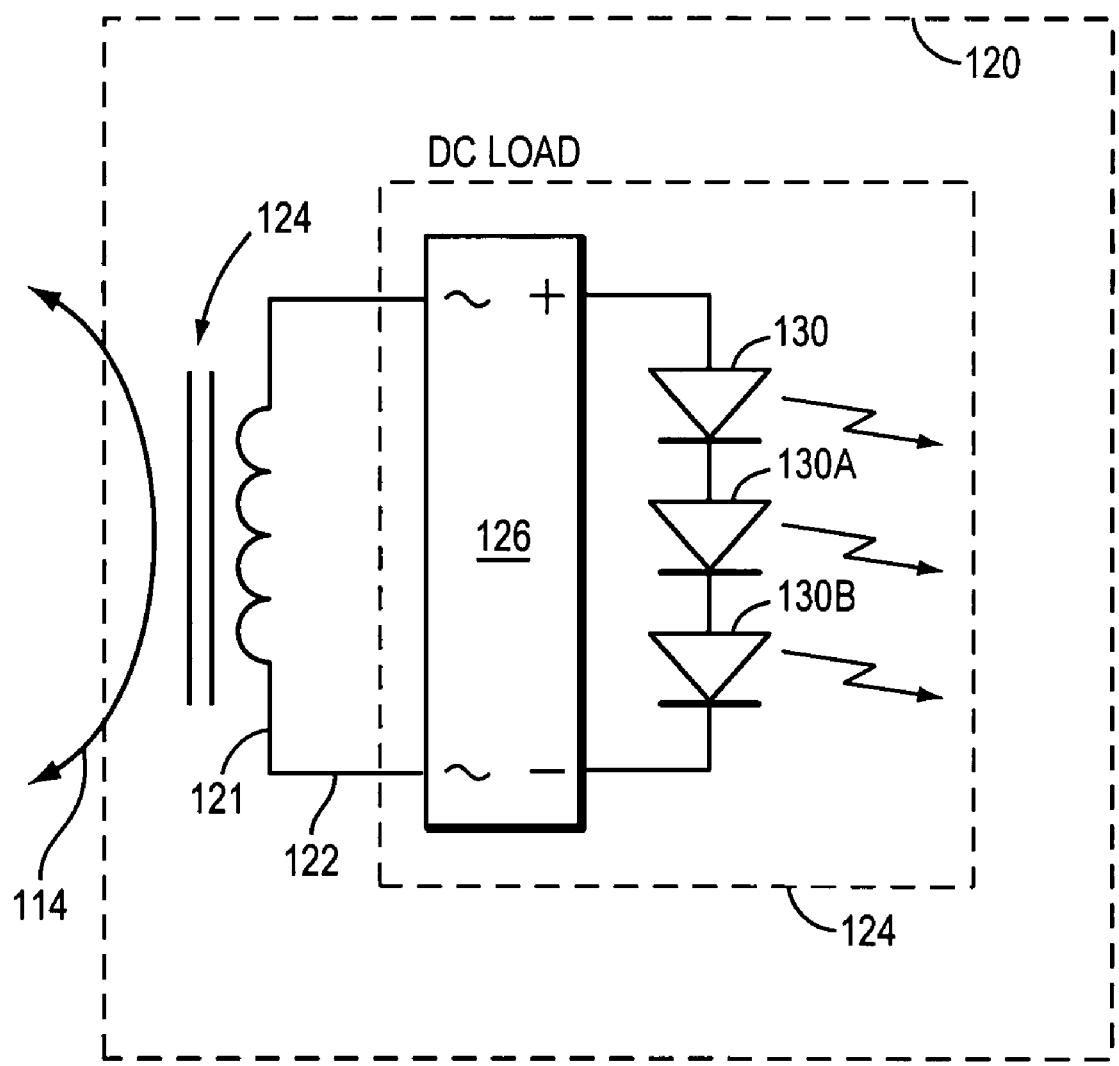
FIG. 2A illustrates an illumination module for use with the illumination system of FIG. 2.

Referring to FIG. 2A, illumination module 120 includes the electromagnetic coupling element with a primary wire 114 and a secondary wire 121 inductively coupled together using a magnetic element 124 (preferably made of a ferrite material). Secondary wire 121 is connected to an AC to DC converter 126 providing power to LEDs 130, 130A and 130B; that is a DC load 124. Electromagnetic coupling element 232 (shown in FIG. 4B) includes a secondary wire 121 (162 in FIG. 4B) wound around ferrite core 124 (164 in FIG. 4B) to form a coil, wherein secondary wire 121 is electrically connected to provide current to light sources 130. Ferrite core 164 is constructed and arranged to receive current loop 114 inside the corresponding magnetic path in a removable arrangement. Advantageously, this enables easy and convenient assembly of several illumination modules, for example inside a letter channel. As shown in FIG. 2A, several LEDs are connected together. The absence of a ballast resistor connected to the LEDs increases the efficiency (which may be even greater than 95%) obtained from the input power for the light source to produce light.

Figure 4:
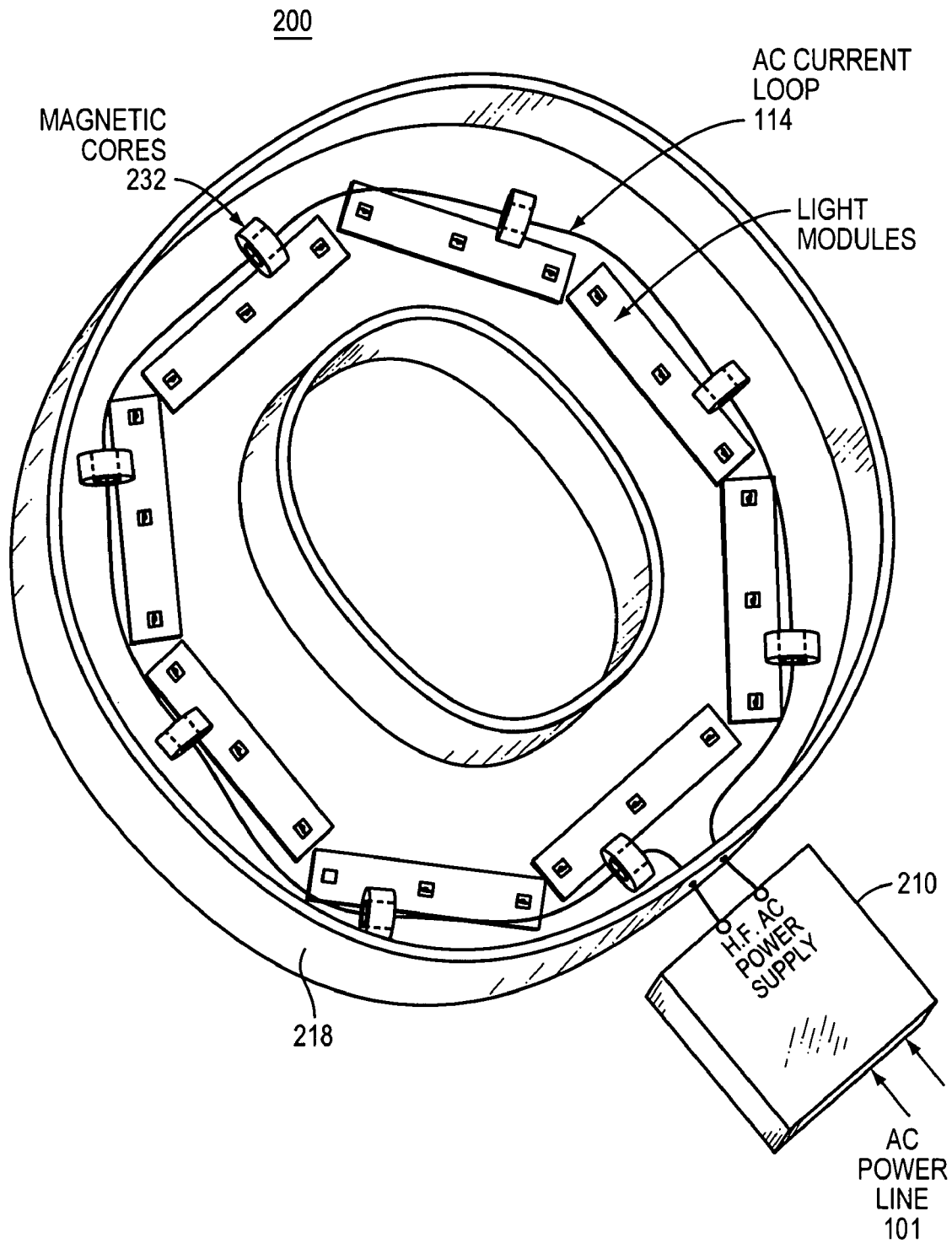
FIG. 4 illustrates an illumination system including illumination modules installed in a letter channel.
Figure 4A:
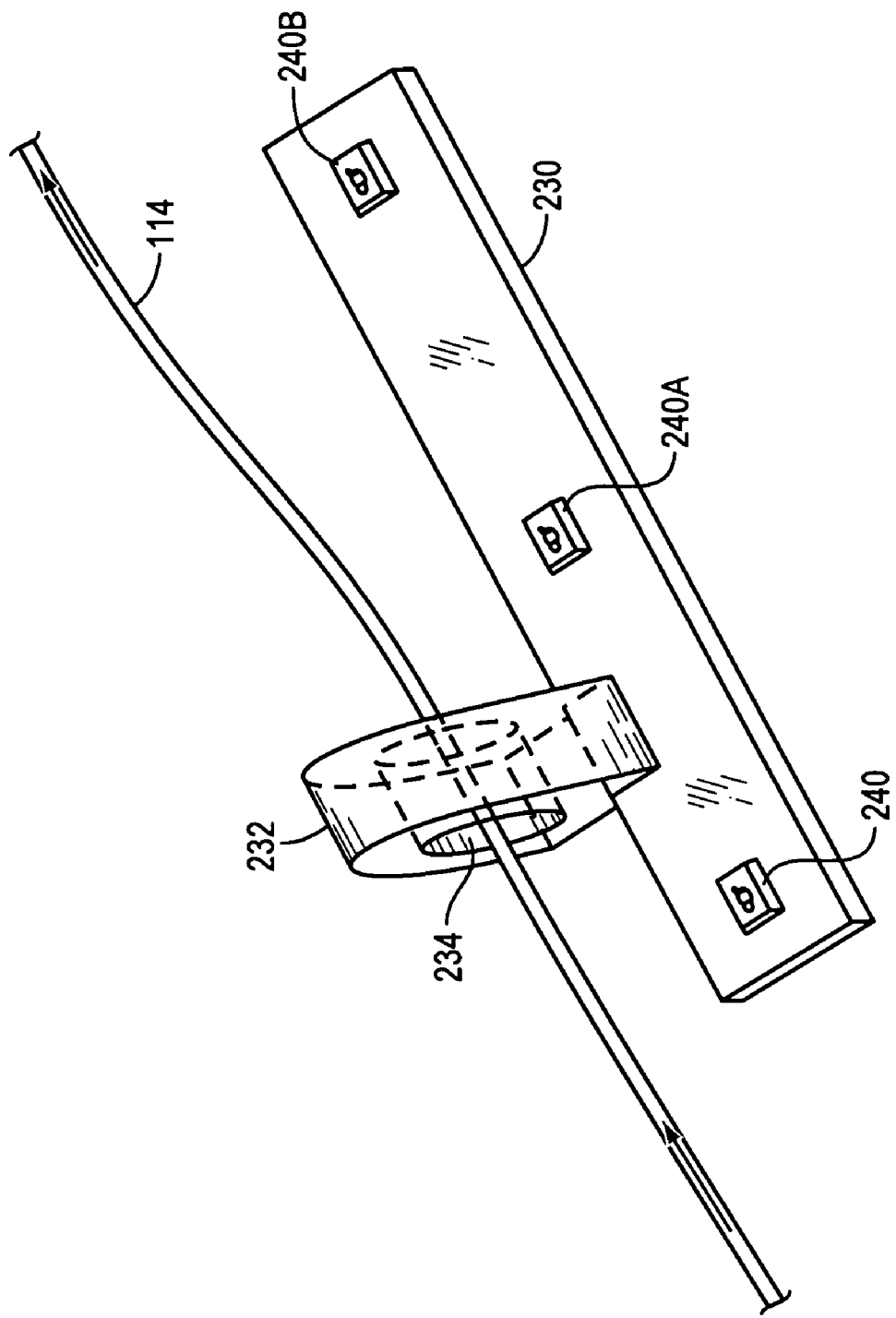
FIG. 4A illustrates an illumination module used with the illumination system of FIG. 4.
Figure 4B:
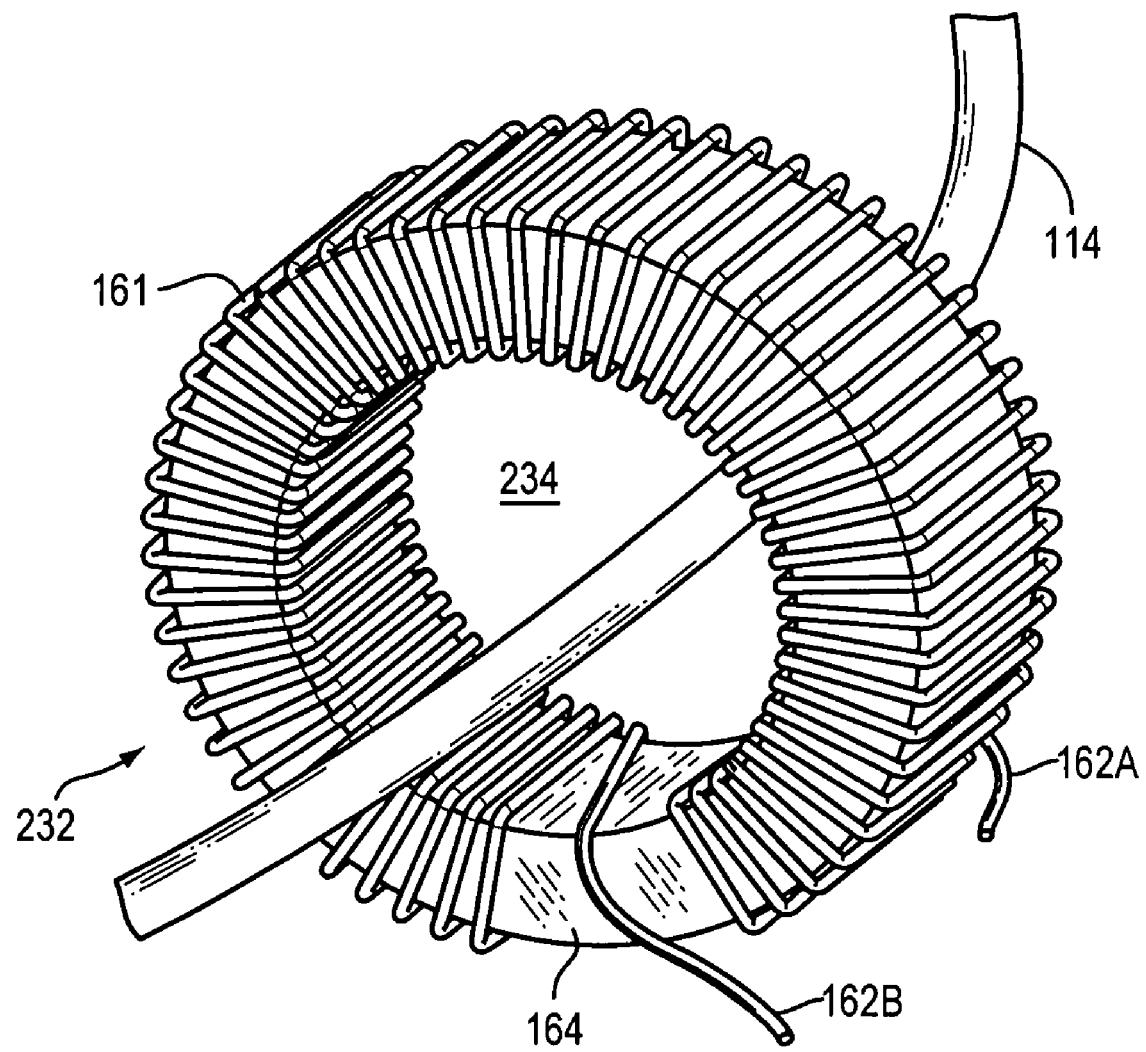
FIG. 4B illustrates a contactless coupling element for use with any one of the illumination modules shown in FIGS. 2, 3, and 4.

Referring to FIG. 4B, electromagnetic coupling element 232 is preferably a sealed unit having the secondary wire wound around the ferrite core, with both the secondary wire and the ferrite core sealed in a water resistant manner. Electromagnetic coupling element 232 couples the electric power from primary wire 114 to secondary wire 121 (FIG. 2A) by induction as expressed in Faraday's law. That is, the AC current in primary wire 114 induces a voltage in coil 121 of the secondary wire, which provides electrical power delivered to the light sources. The secondary current is equal to the primary current divided by number of turns.

As shown in FIG. 2, primary wire 114 is electromagnetically coupled (i.e., "proximity coupled") to several secondary wires by the contactless electromagnetic coupling element, and thus primary wire 114 induces a voltage in several secondary coils wound around the ferrite cores. The output of electromagnetic coupling element 232 provides a true current source coupled to secondary wire 121. While current loop wire 114 (i.e., the primary wire) is preferably located inside the ferromagnetic core within the magnetic flux loop, other positions and geometries with respect to the ferrite core may be used as long as sufficient inductive coupling occurs.

Figure 2B:
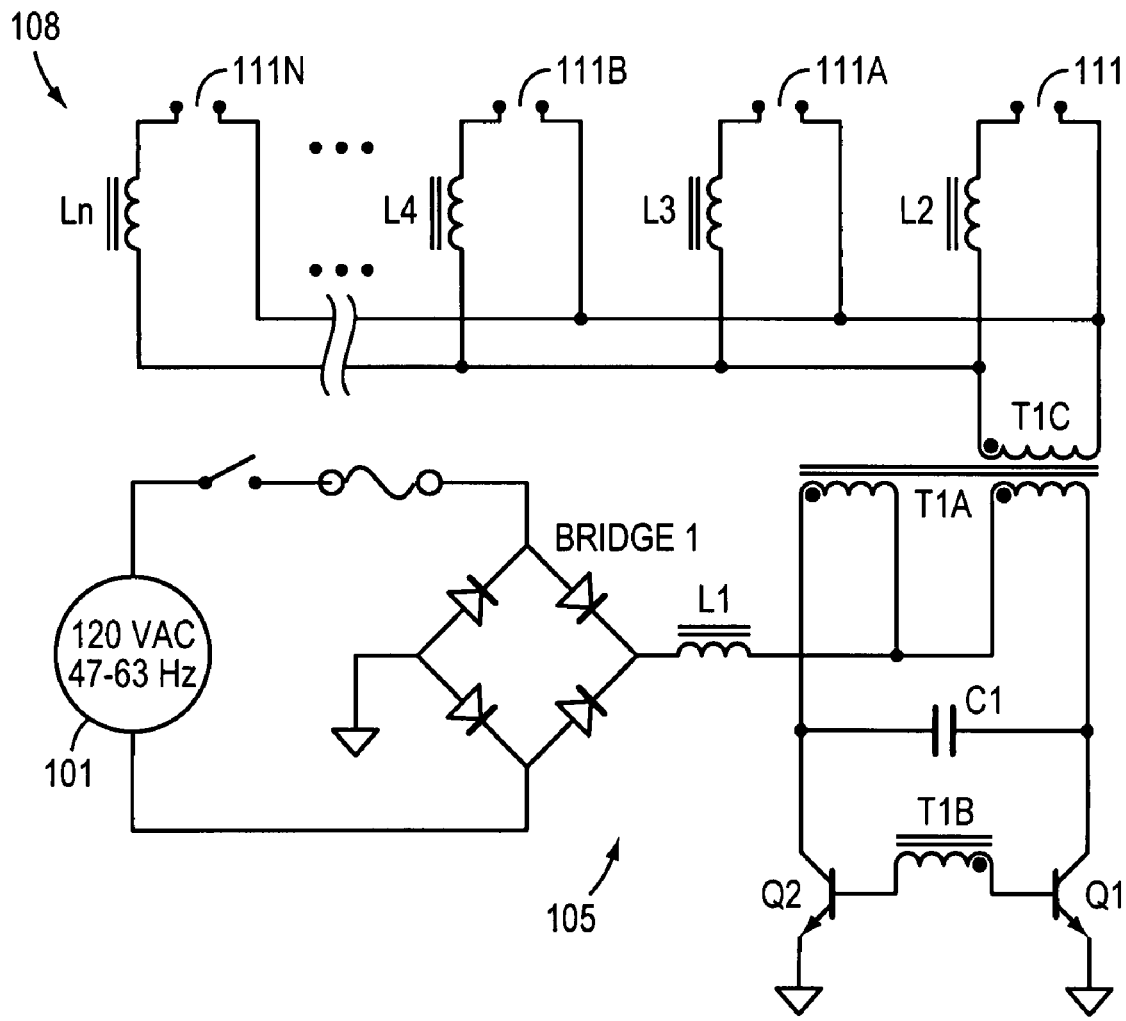
FIG. 2B illustrates an embodiment of a high frequency power supply.

Referring to FIGS. 2 and 2B, high frequency power supply 102 includes a rectifier (a bridge, or a DC source) connected to a high-frequency inverter 105, which is in turn connected to a primary side of a transformer T1. The high-frequency inverter uses a sinusoidal resonant circuit topology with two bipolar transistors Q1 and Q2. The collectors of transistors Q1 and Q2 are connected to the primary coil of transistor T1. As shown in FIG. 2B, the two transistors are turned ON and OFF and are arranged to provide a high current gain. The oscillation frequency depends on the capacitance of a capacitor C1 and the inductance of primary coils of transformer T1, having capacitor C1 connected across the primary winding. The auxiliary winding of transformer T1 is used to drive the bases of transistors Q1 and Q2. The secondary side T1C includes preferably one inductor (L2, L3 . . . Ln) for each current loop. The inductor converts the output voltage of transformer T1 (in the secondary side T1C) into an AC current source. Each current loop is connected to a connector 111 (or connectors 111A, 111B . . . 111N), in an arrangement that has a single current loop providing power to one or several illumination modules.

Optionally, as shown in FIG. 2B, the secondary side T1C provides several separate current sources. Each current source is provided from the secondary side of transformer T1, wherein the separate current loops are each connected to connectors 111A, 111B, 111C . . . 111N. In each current loop, the inductor (i.e., one of inductors L2, L3, L4 . . . LN) converts the output voltage of transformer T1 (secondary side T1C) into an AC current source connected to one of the respective connectors 111A, 111B, 111C . . . 111N. Inductors L2, L3, L4 . . . LN form current limiters for the respective current loops. Each current loop may be used for a separate set of illumination modules (120, 120A, 120B, 120C, . . . 120N, as in FIG. 2) having, for example, different color LEDs. Thus, high frequency power supply can provide power to multicolor display having separate LED modules.

Figure 10:
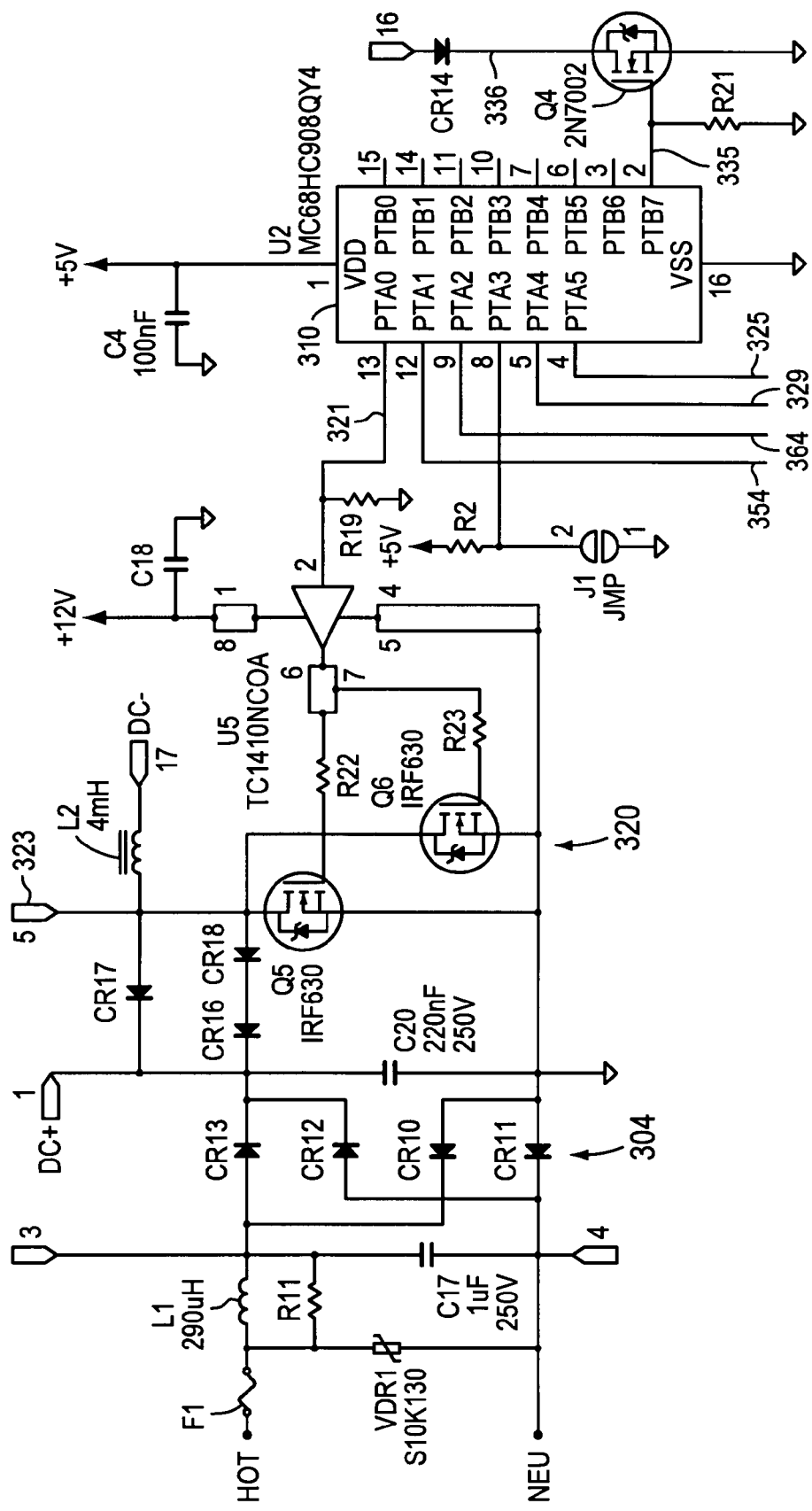
FIGS. 10, 10A, 10B, 10C and 10D show a schematic diagram of the high frequency power supply illustrated in FIG. 9.
Figure 10A:
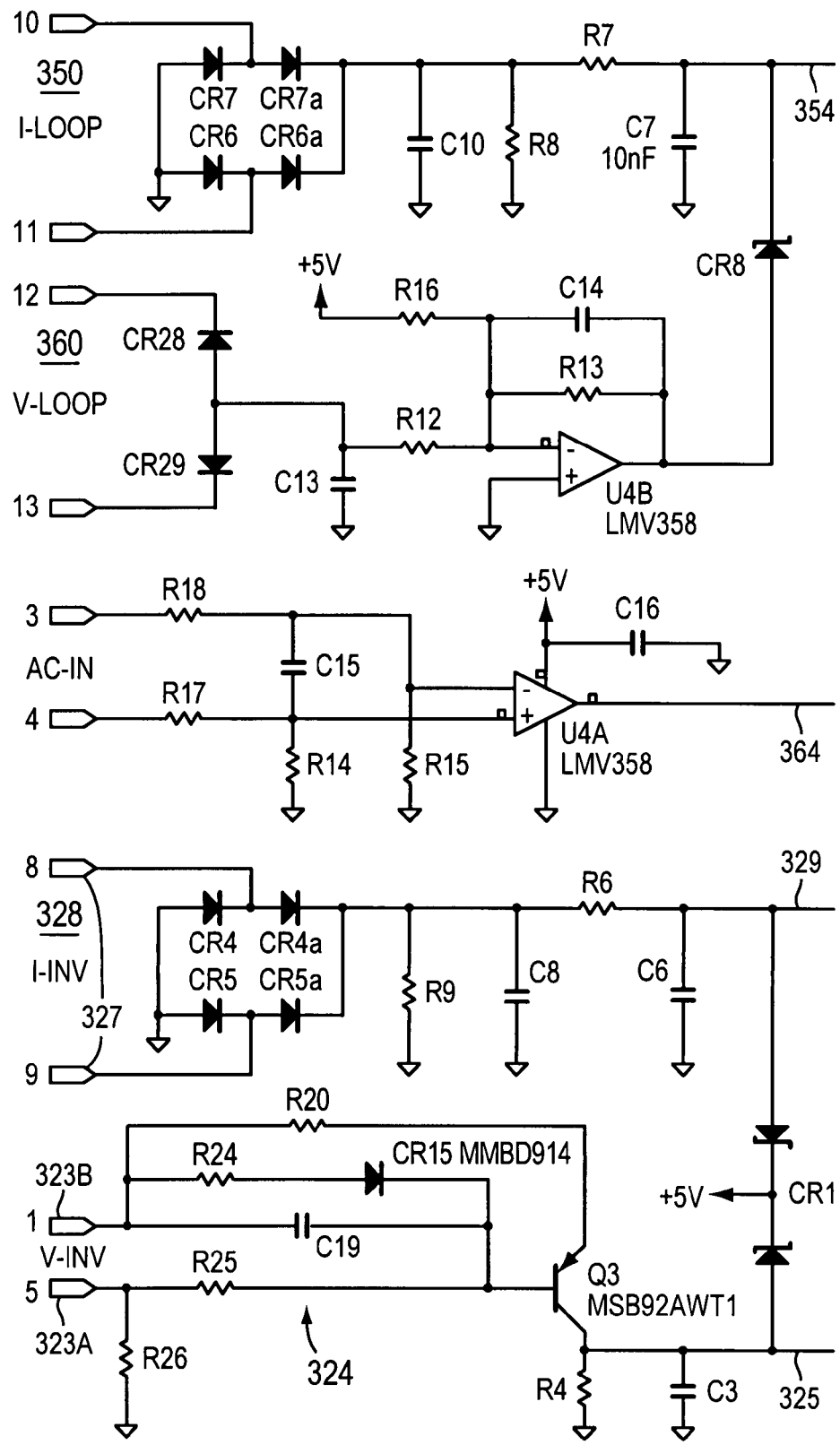
Figure 10B:
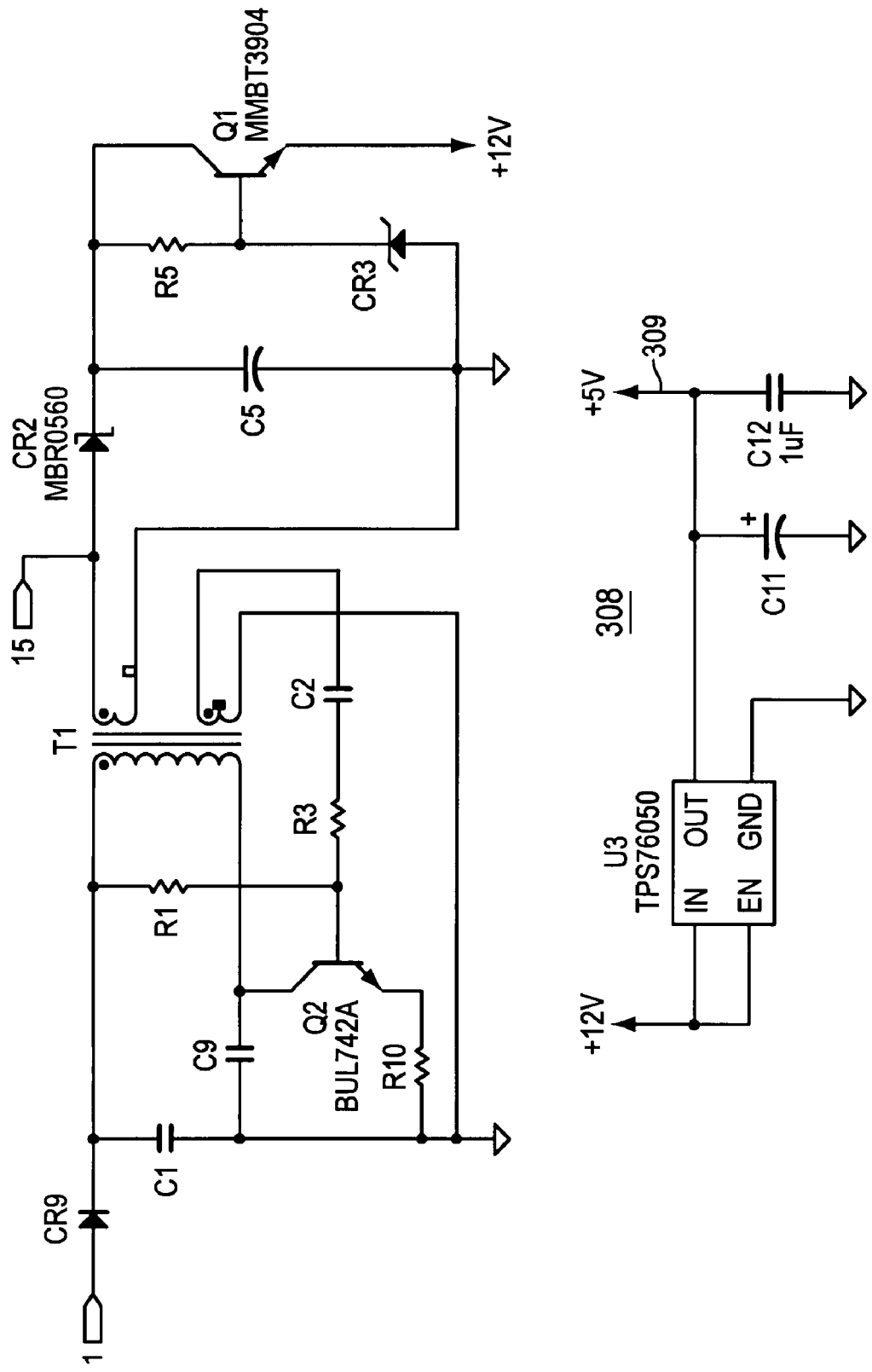
Figure 10C:
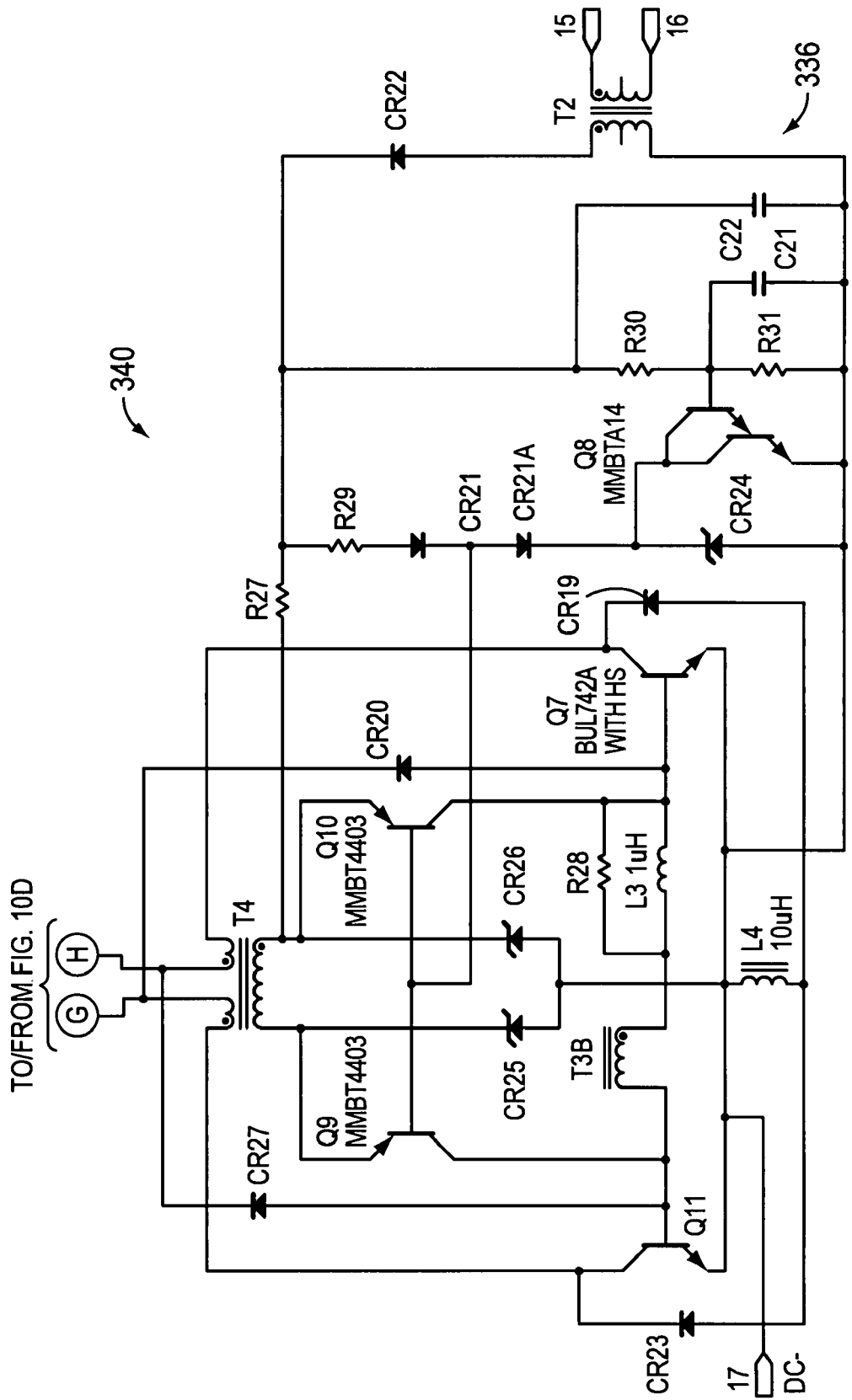

Alternatively, (as shown in FIG. 10C) the high-frequency inverter may use a sinusoidal resonant circuit topology with four bipolar transistors, arranged as two pairs of transistors, wherein in each pair the emitter of the first transistor drives the base of the second transistor (i.e., Darlington pair). These two pairs are turned ON and OFF to provide an oscillating current at a high current gain. The oscillation frequency depends on the capacitance of the capacitor connected across the primary coil and the inductance of primary coil of the transformer. The auxiliary winding of this transformer is used to drive the bases of the transistors. The inverter may also include two diodes connected to the collectors of the transistors (across the primary side) together with an inductor, connected between the two capacitors and the emitters of the transistors to allow fast power inverter to turn OFF at anytime during the 60 Hz sign wave. The two capacitors correct the power factor of the inductor.

The output from AC output current source has a sine waveform at a frequency in the possible range of 10 kHz to 100 kHz, or preferably in the range of 20 kHz to 40 kHz, and preferably 30 kHz, and the output voltage in the possible range of 10 Vac to 200 Vac or preferably in the range of 12 Vac to 24 Vac. As shown in FIG. 2A, the secondary wire 121 is connected to a rectifier 126, which receives the induced AC power and provides a DC current to a set of light emitting diodes 130. The light emitting diodes (LEDs) are located inside of a letter channel or are used for other illumination.

Figure 3:
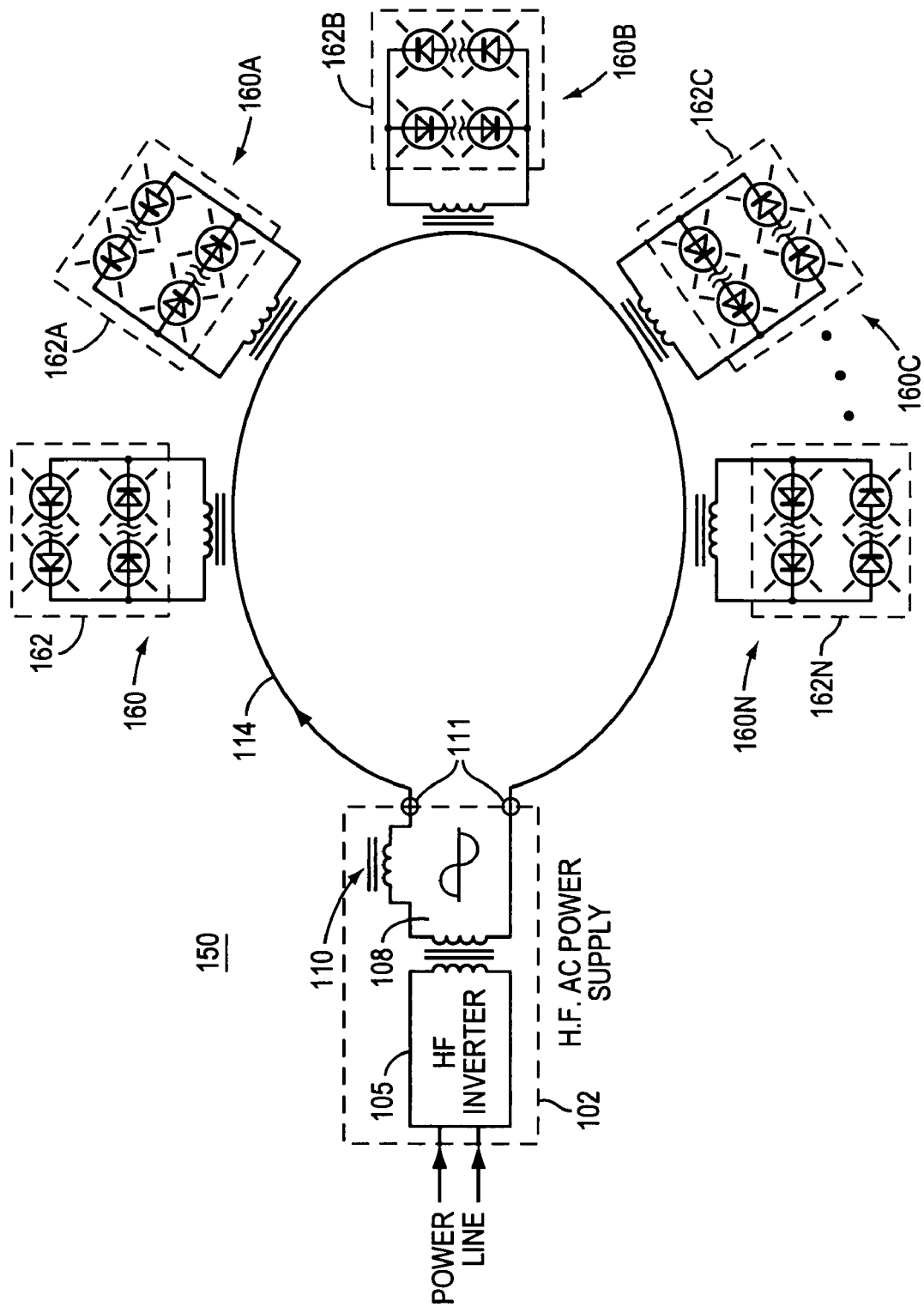
FIG. 3 illustrates another embodiment of an illumination system including a high frequency power supply and several illumination modules.

FIG. 3 illustrates another embodiment of an illumination system. Illumination system 150 includes a high frequency AC power supply 102 powered by a power line 101. HF power supply 102 includes HF inverter 105 and AC current source 108 with current limiter 110. The output from the high frequency AC power supply 102 is provided to primary current loop 114, providing in turn power to several illumination modules 160, 160A, 160B, 160C . . . 160N. Each illumination module 160 includes an electromagnetic coupling element 232 (shown in FIGS. 2A, 4A and 4B) and an AC load 168. As described above, electromagnetic coupling element 232 includes ferrite core 164 arranged to receive current loop 114 in a removable arrangement.

Figure 3A:
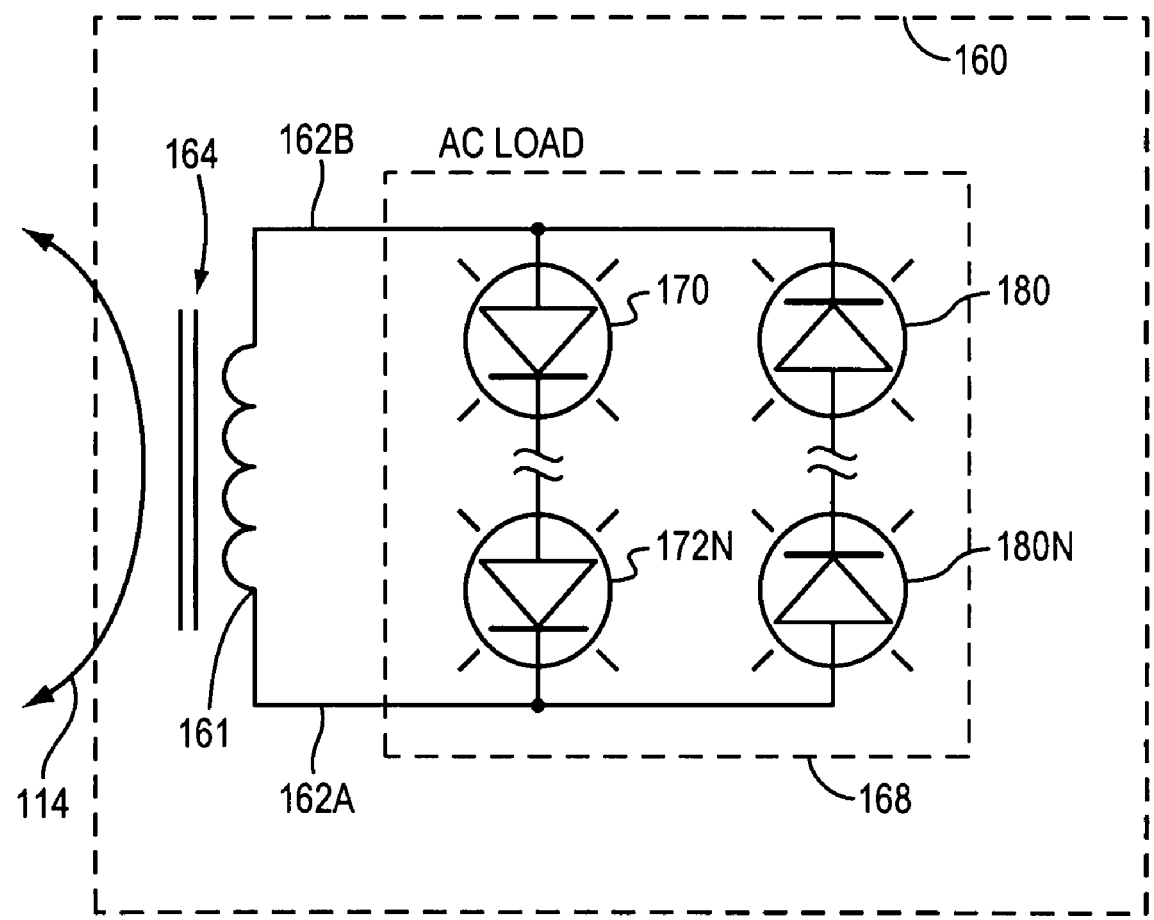
FIG. 3A illustrates an embodiment of an illumination module for use with the illumination system of FIG. 3.

FIG. 3A illustrates an illumination module 160 for use with the illumination system of FIG. 3. Electromagnetic coupling element 232 (shown in detail in FIG. 4B) also includes a secondary wire 161 wound around ferrite core 164 to form a coil, wherein secondary wire 161 is connected to provide current to light sources 168. Electromagnetic coupling element 232 is preferably a sealed unit having the secondary wire wound around the ferrite core. The secondary output of electromagnetic coupling element 232 provides a true current source.

In illumination module 160, the output from secondary wire 161 (i.e., connections 162A and 162B) provide AC current directly to LEDs 170 ... 172N, and 180 ... 180N. In this AC load, one half of the LEDs is powered on the positive cycle and the other half on the negative cycle. There is no need to use a ballast resistor coupled to the LEDs, since the magnetic core winding generates a true current source. The absence of a ballast resistor connected to the LEDs increases the efficiency (which may be even greater than 95%) obtained from the input power for the light source to produce light. The LEDs may be replaced with incandescent lamps, electroluminescent devices, or other low-voltage to medium-voltage light sources.

FIG. 4 illustrates the illumination system of FIG. 3 used in a letter channel 218. The high-frequency AC voltage power supply 210 provides current to an AC current loop 114, which provides power to the individual illumination modules (shown as light strips) located in letter channel 218. FIG. 4A illustrates an illumination strip (or light module) located in letter channel 218. As described above, electromagnetic coupling element 232 shown in FIG. 4A provides contactless coupling to the illumination modules shown in FIG. 2, 3 or 4.

Figure 4C:
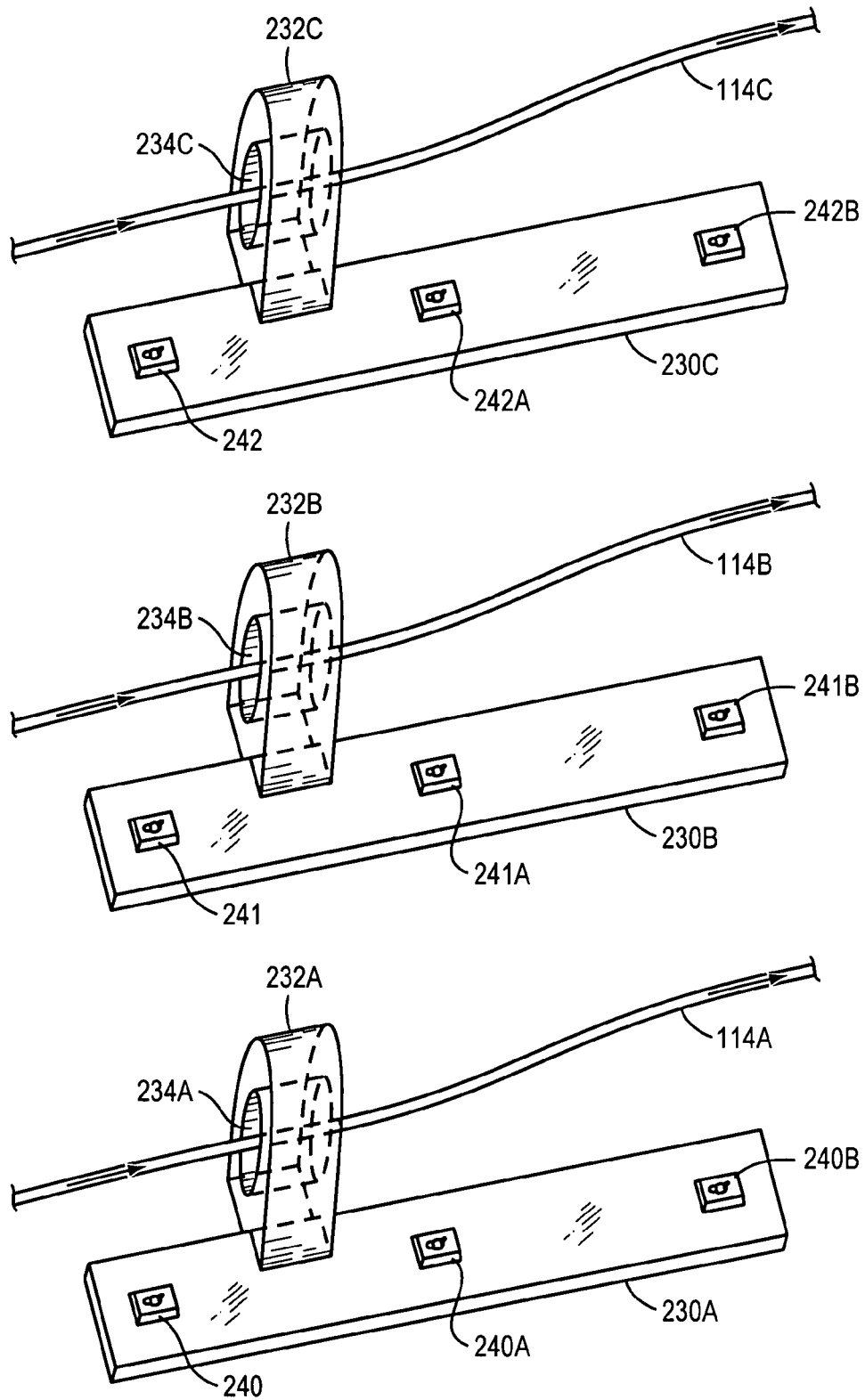
FIG. 4C illustrates several illumination modules for multicolor illumination.

FIG. 4C illustrates the illumination system utilizing a power supply shown in FIG. 2B and several illumination strips 230A, 230B, and 230C. Each illumination strips 230 can have different color light sources (for example, red, green or blue). The illumination strips may be controlled separately by controlling the current in the separate current loops 114A, 114B, and 114C (e.g., by employing a computerized control on each loop). This way, the illumination system can generate different light effects.

Figure 5:
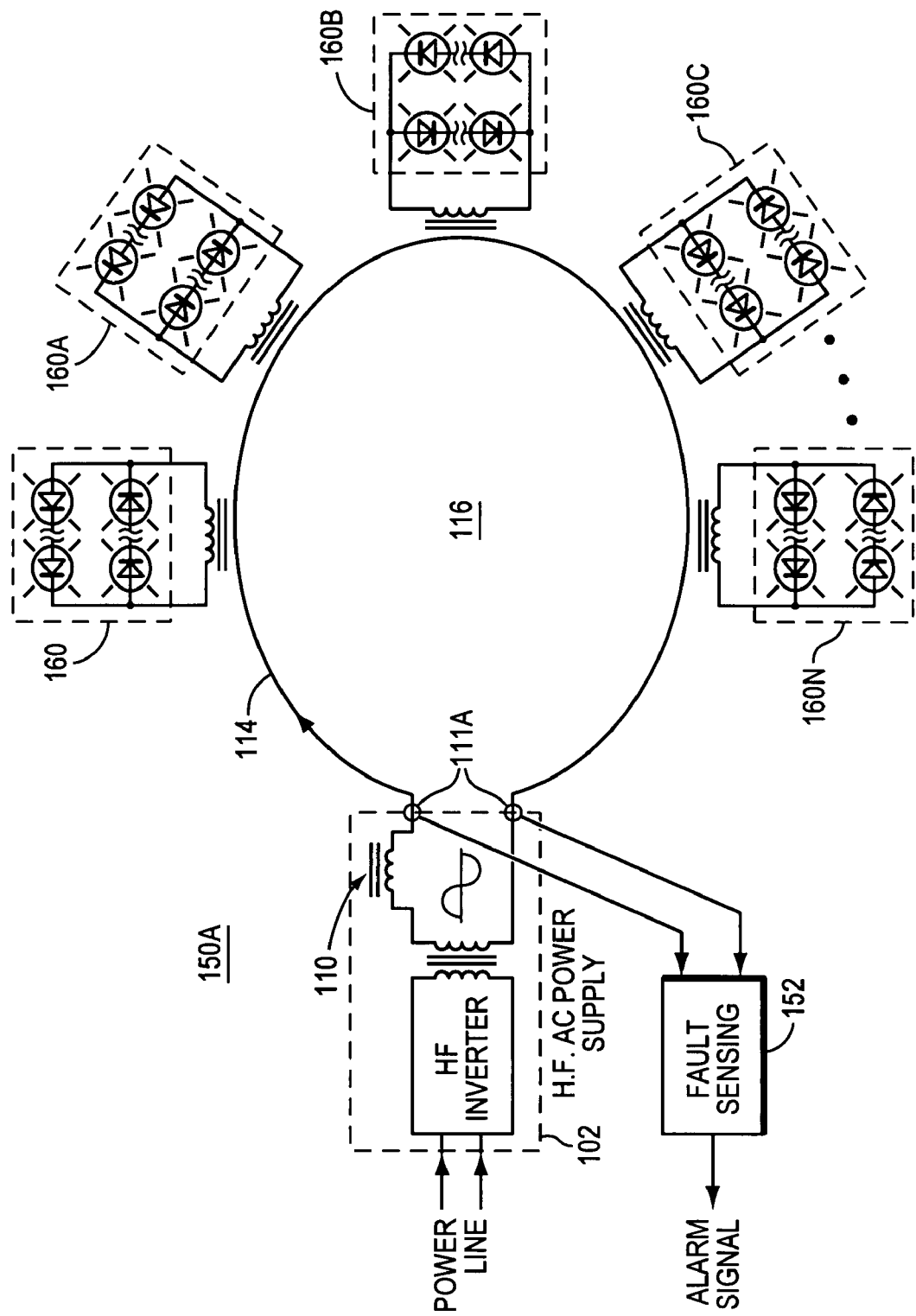
FIG. 5 illustrates the illumination system shown in FIG. 3 used with a fault sensing unit.

FIG. 5 illustrates illumination system 150A also including a fault-sensing unit 152. Fault sensing unit 152 detects changes in voltage across current loop 114 at connectors 111A. The voltage changes (i.e., increase or decrease) are a signature of a fault in one of the illumination modules 160. Fault sensing unit 152 is connected to monitoring by a computer or telemetry to provide and store any faults in the illumination system 150 for later repair. Furthermore, fault sensing unit 152 may initiate an alarm signal.

Figure 5A:
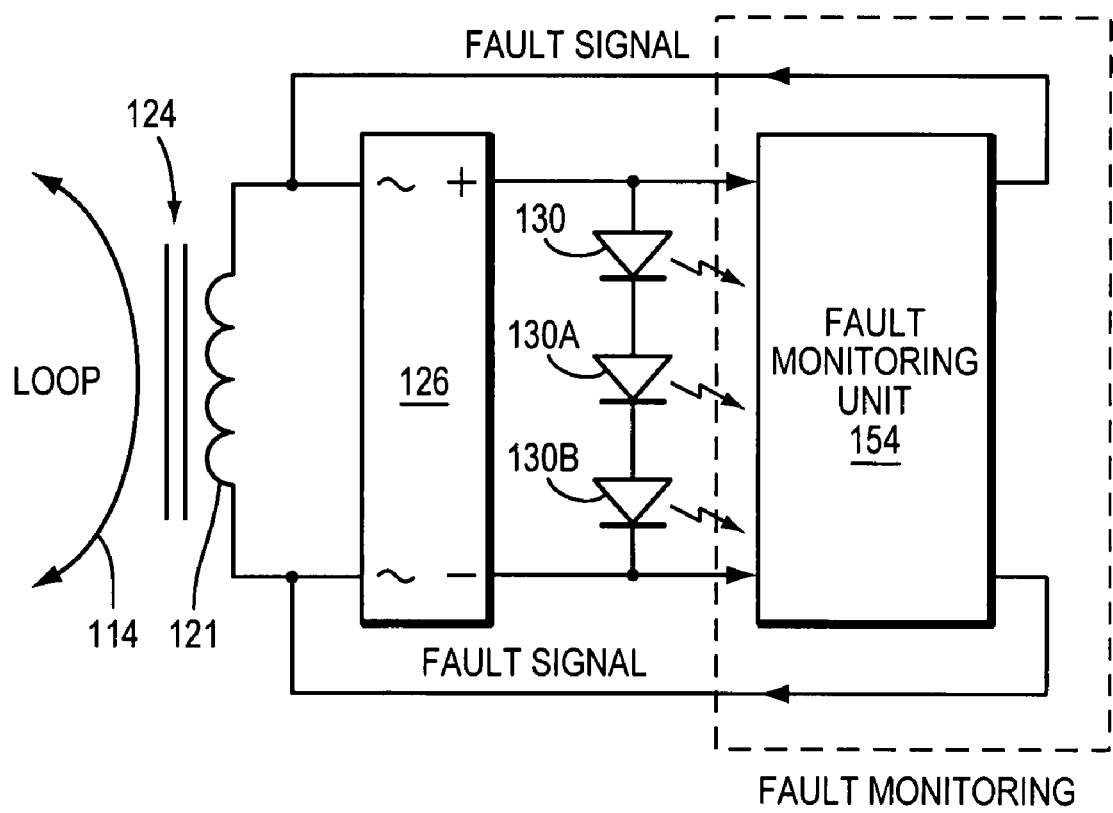
FIG. 5A illustrates the illumination module shown in FIG. 2A used with a fault monitoring unit.

FIG. 5A illustrates a fault monitoring unit for use with illumination module 120 shown in FIG. 2A. The fault monitoring unit monitors the voltage across light sources 130, 130A . . . and provides a fault signal injected into secondary wire 121. In the embodiment of FIG. 5A, this signal is injected on the AC side of illumination module 120. In general, the injected fault signal is then coupled from secondary wire 121 to current loop 114. Fault sensing unit 152 (FIG. 5) then detects the response to the injected signal and stores the fault. The injected signal can be coded (e.g., ripples of different size and duration) to identify the illumination module where the fault occurred.

The above-described illumination systems may be used with different illumination modules including commercially available light sources. There are several different commercially available embodiments of the LED modules. Super White STP30XC Hi-Flux StripLED® Modules may be used alone or connected to one another, enabling configuration of channel and reverse-channel letters, signs, and displays. These modules are available in lengths of 6, 12, and 24 in. strips, and feature 6, 12, and 24 Cool White 7,500 K Spider LEDs, respectively. Each module includes a double-ended connector harness for daisy-chain assembly, and a pre-applied strip of 3M® double-sided foam tape for peel-and-stick placement.

Alternatively, hi-flux, interconnectable StripLED® LED modules may be used, which deliver high brightness and possess high flexibility. Specifically, LEDtronics® manufactures series STP30XC super white LED light strips that may be used alone or connected to one another, making it easy to configure lighting solutions for channel and reverse-channel letters, signs, displays, under-the-counter and architectural applications. These light strips are available in lengths of 6-inches, 12-inches and 24-inches, and they feature 6, 12 and 24 Cool White (7500K) LEDtronics SpiderLEDs, respectively. The STP306 is a 6-inch, 6 LED model that uses 0.72 Watts, emits 1.2 fc and provides 29 lumens with a viewing angle of 85°. The STP324 is a 24-inch, 24 LED model that uses 2.88 Watts, emits 48 fc and provides 115 lumens with a viewing angle of 85°. Each module has a double-ended connector harness for easy daisy-chain assembly, and a pre-applied strip of 3M® double-sided foam tape for "peel and stick" placement. The Inter-Connector Module facilitates linking modules. One Inter-Connector module and one power adapter cable are included with each light strip purchased. In addition to channel-letter applications, Strip LED may be used in buildings, amusement parks, theaters, stairways, emergency exit pathway lighting, etc. These light strips eliminate many of the shortcomings of neon or fluorescent lamps such as heat, broken tubes and ballast failures.

Figure 6:
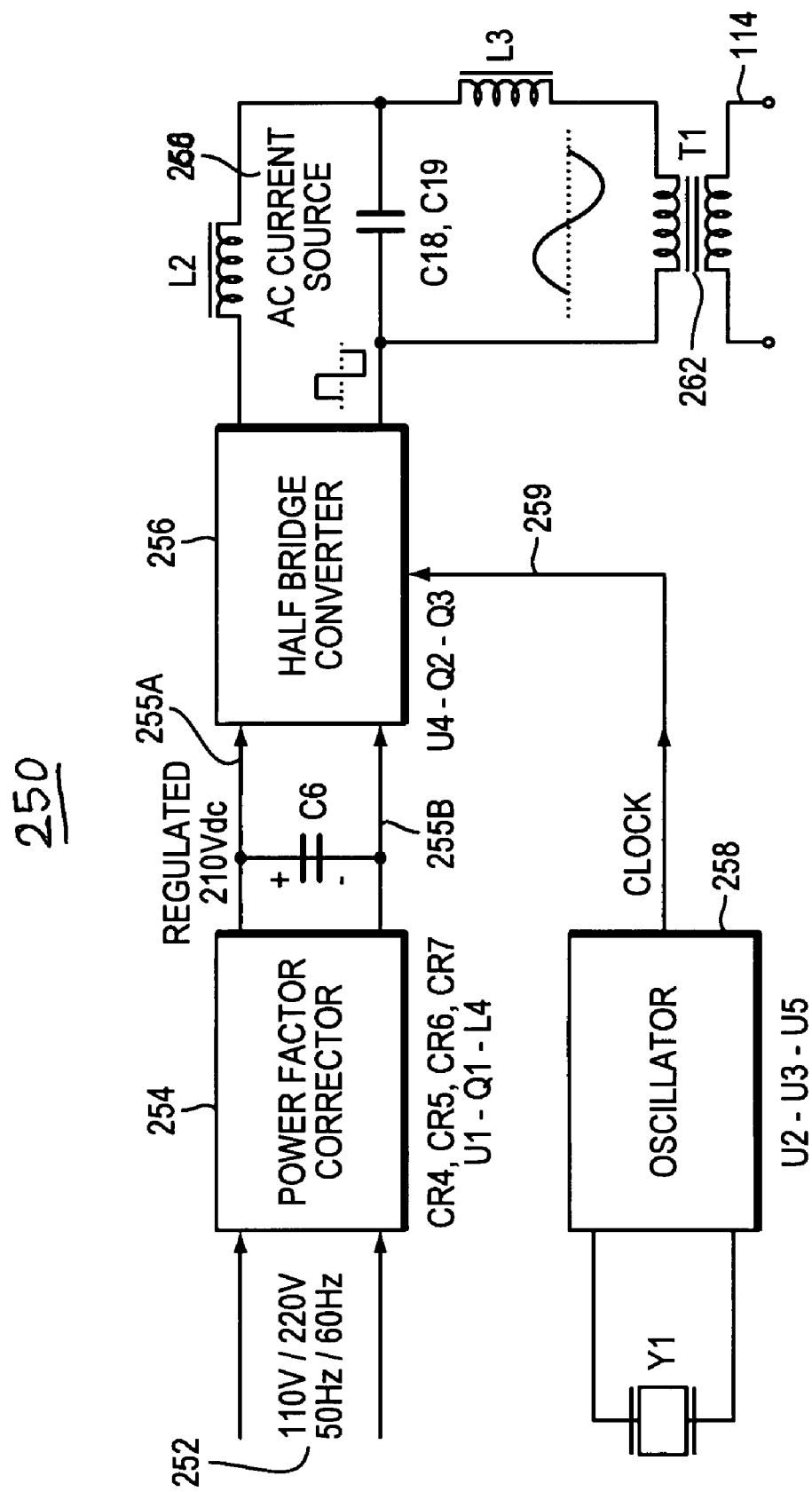
FIG. 6 illustrates diagrammatically another embodiment of a high frequency power supply for use in an illumination system.
Figure 7:
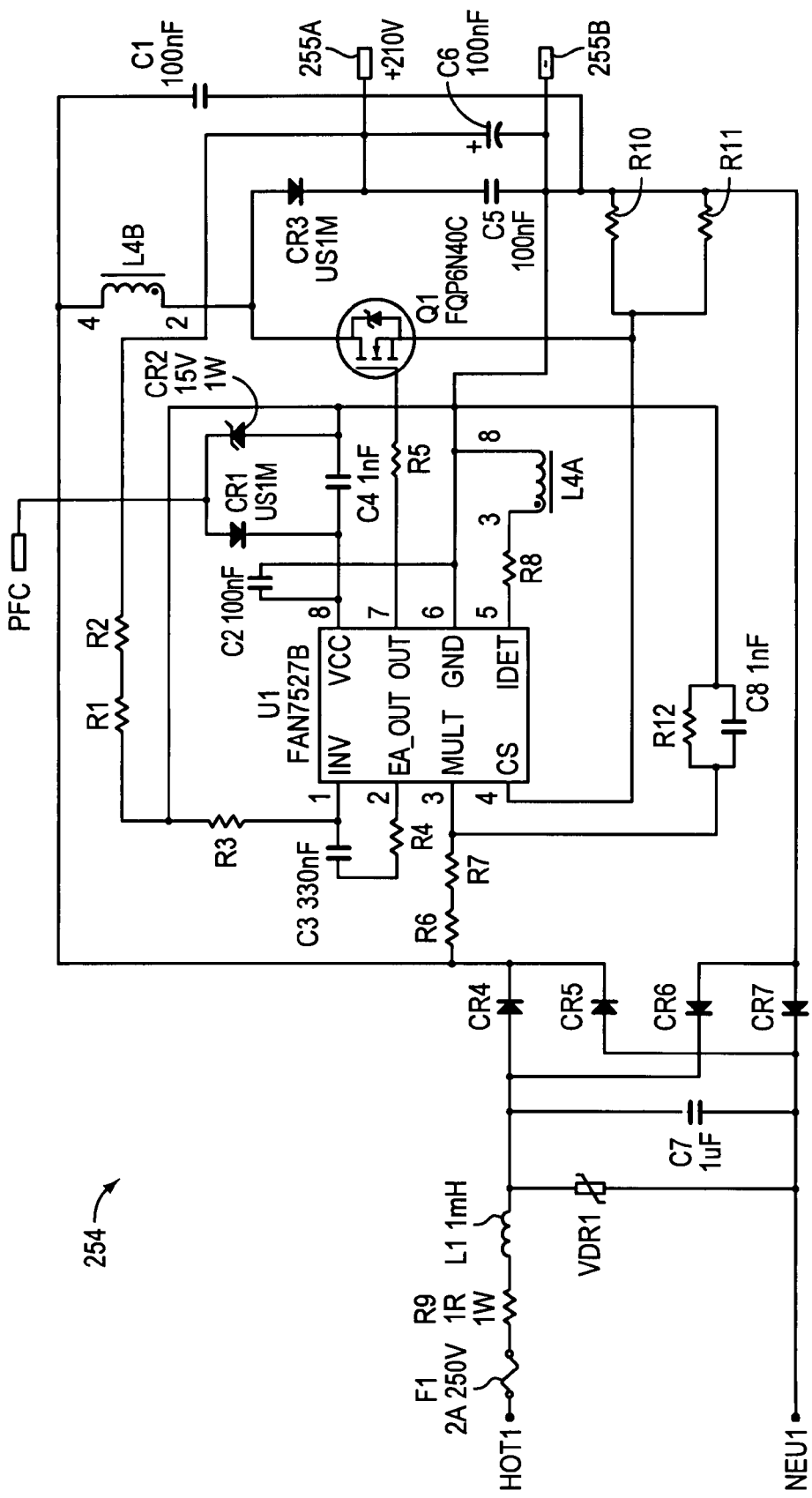
FIGS. 7, 7A and 7B show a schematic diagram of the high frequency power supply illustrated in FIG. 6.
Figure 7A:
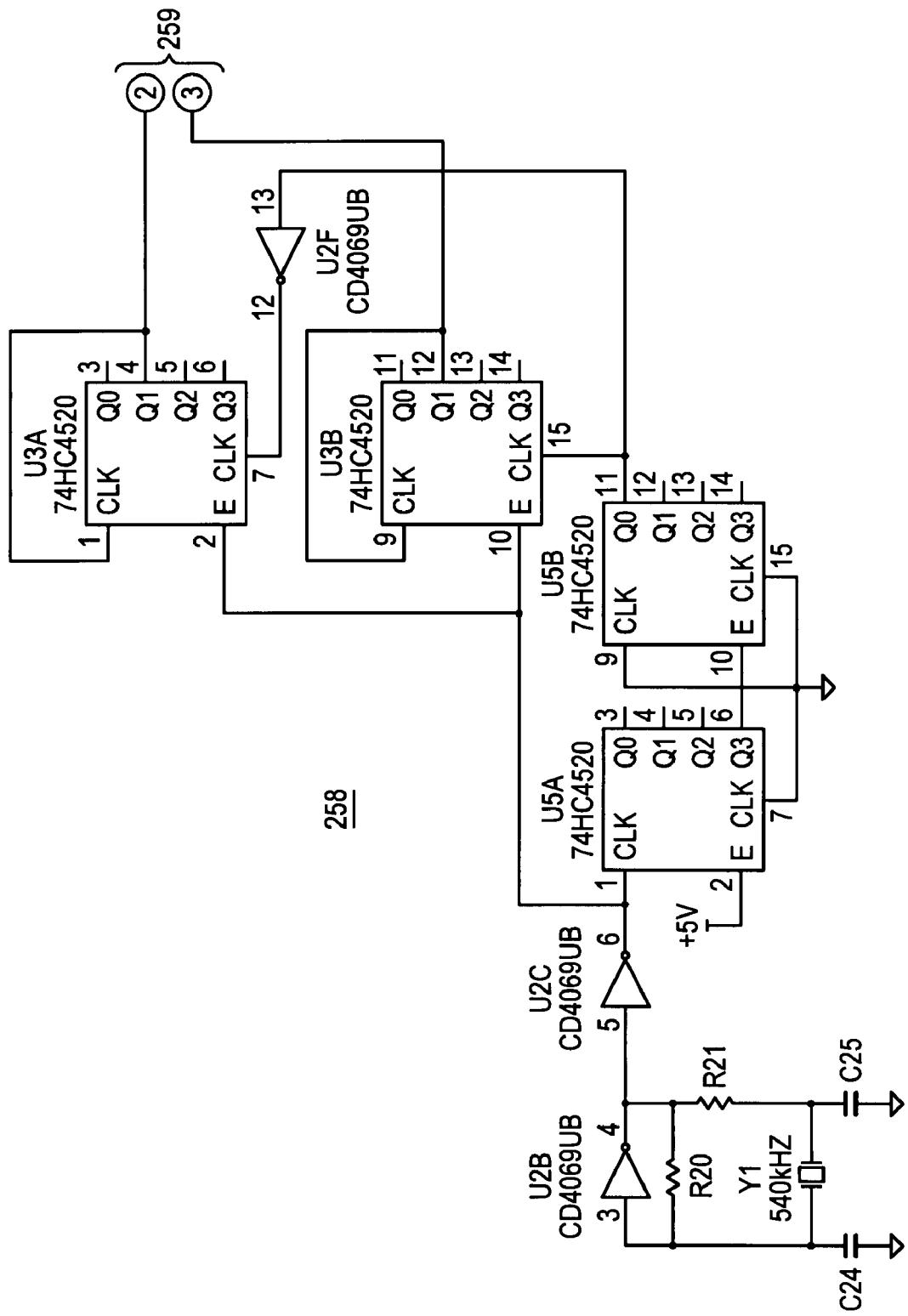
Figure 7B:
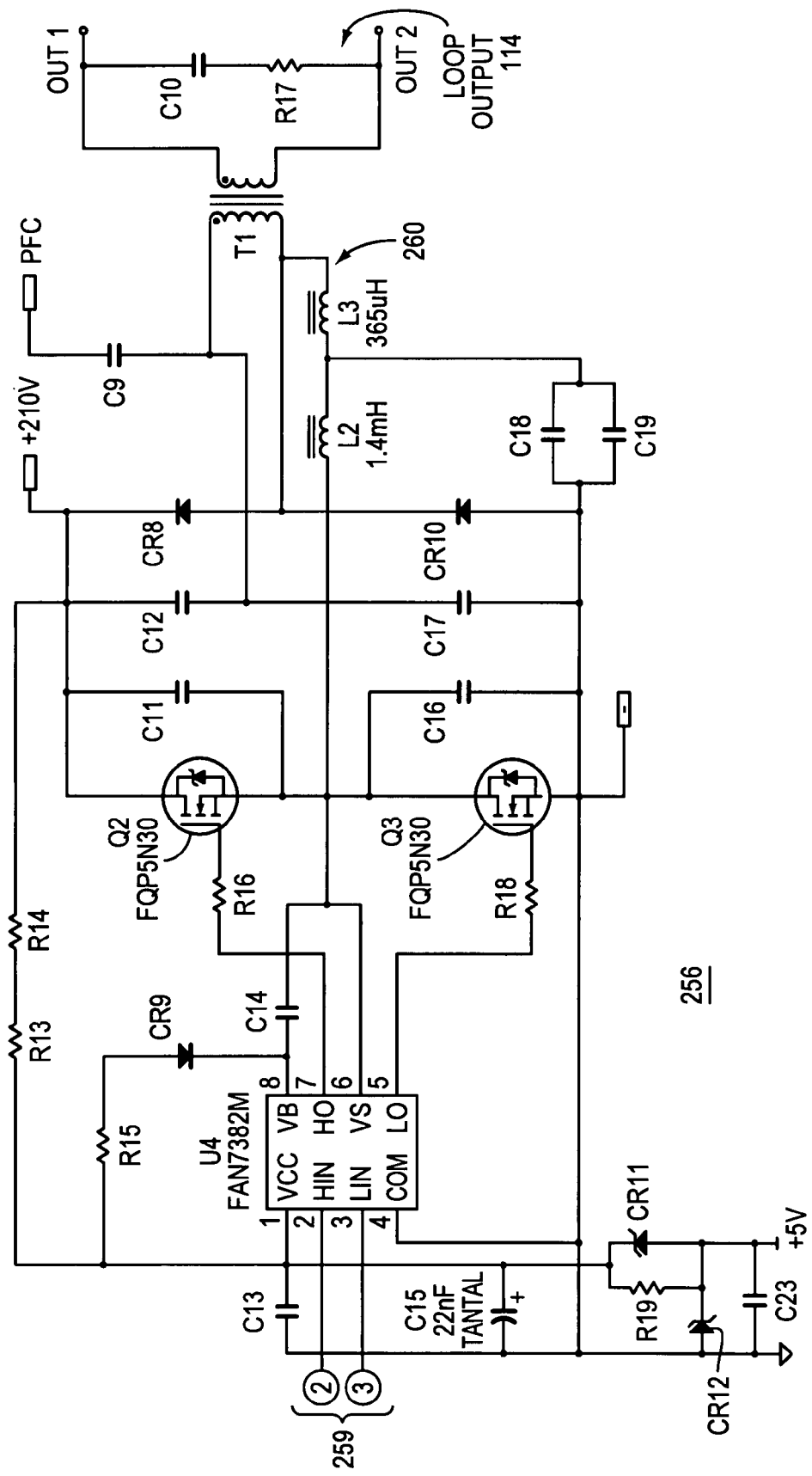

FIG. 6 illustrates diagrammatically a high frequency power supply 250. HF power supply 250 includes a power factor corrector 254, a half bridge converter 256, an oscillator 258, and an AC current source 260 providing a sinusoidal output to the current loop 114 described above. FIGS. 7, 7A and 7B show a schematic diagram of the high frequency power supply illustrated in FIG. 6. Referring to FIG. 7, the AC power input is provided to four SMA controlled avalanche rectifiers CR4, CR5, CR6, and CR7. Power factor corrector includes power factor correction controller U1 (FAN7527B made by Fairchild Semiconductor) and 400 V N-Channel MOSFET Q1 (FQP6N40C made by Fairchild Semiconductor). The regulated output of about 210 V DC is provided at capacitor C6 to half bridge converter 256.

Also referring to FIG. 7A, oscillator 258 includes four (4) dual 4-bit synchronous binary counters U3A, U3B, U5A, and U5B (74HC4520, made by Fairchild Semiconductor). Oscillator 258 preferably operates at 17 kHz. Also referring to FIG. 7B, half bridge converter 256 includes two 300V N-channel MOSFETs Q2 and Q3 (FQP5N30 made by Fairchild Semiconductor) coupled to a half-bridge gate driver U4 (FAN7382M made by Fairchild Semiconductor). Half-bridge gate driver U4 receives input from oscillator 258. Current source 260 provides output via a transformer 262 to the current loop 114.

Figure 8:
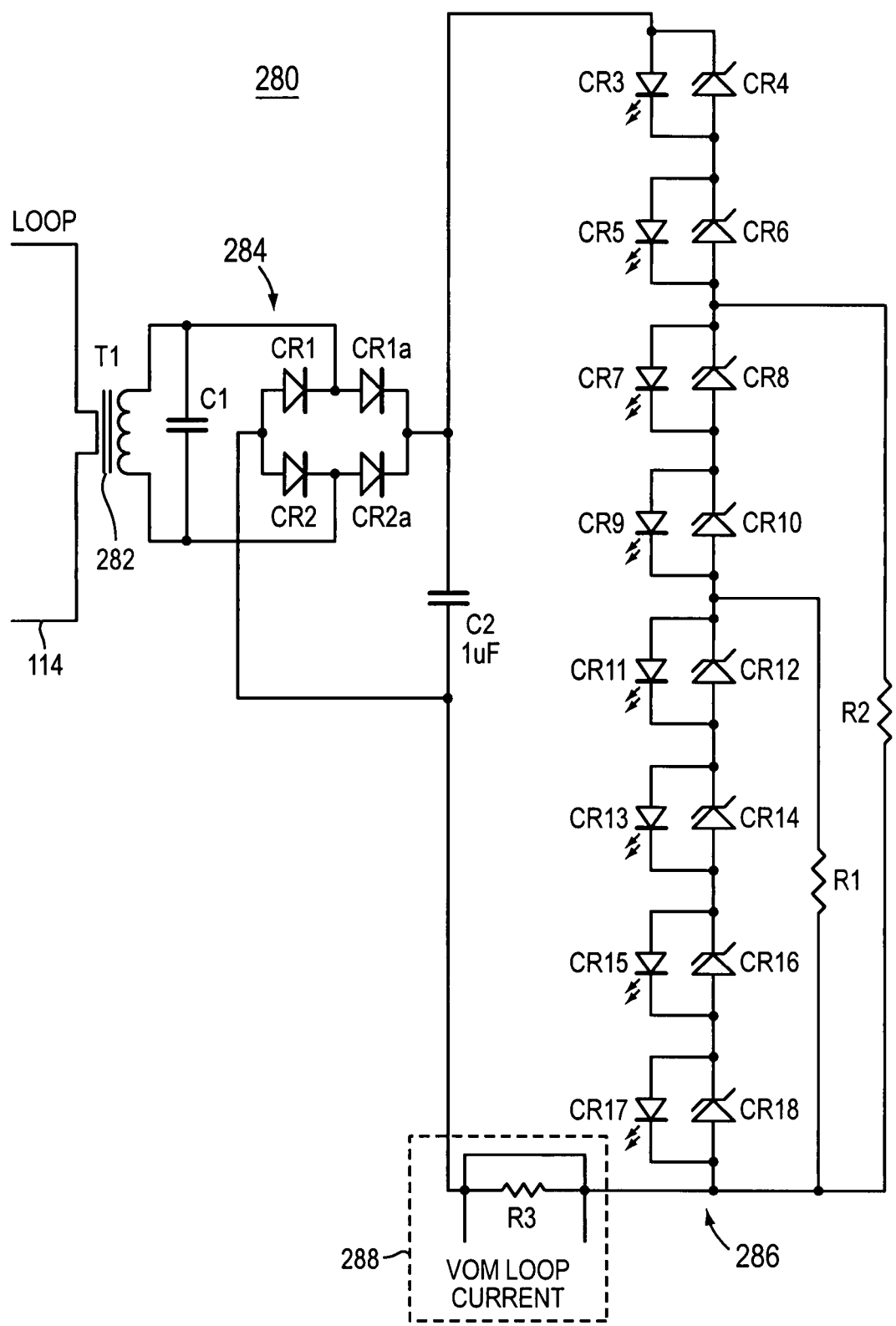
FIG. 8 shows a schematic diagram of an illumination module suitable for use with the high frequency power supply illustrated in FIG. 6.

FIG. 8 shows an illumination module 280 suitable for use with the high frequency power supply illustrated in FIG. 6. Illumination module 280 includes an electromagnetic coupling element 282, an AC to DC converter 284, a series of LEDs 286, and output 288 for diagnostic purposes. Electromagnetic coupling element 282 receives primary wire 114 (as does the coupling element 232 shown in FIG. 4B) and provides secondary wire output across capacitor C1 to AC to DC converter 284. AC to DC converter 284 includes four high-speed double diodes CR1, CR1a, CR2 and CR2a (BAV99 made by Philips Semiconductors). The strip 286 includes, for example, 8 LEDs, each being coupled to a Zener diode. The Zener diodes provide electrical paths in case an individual LED fails so that the remaining LED can still operate.

Figure 8A:
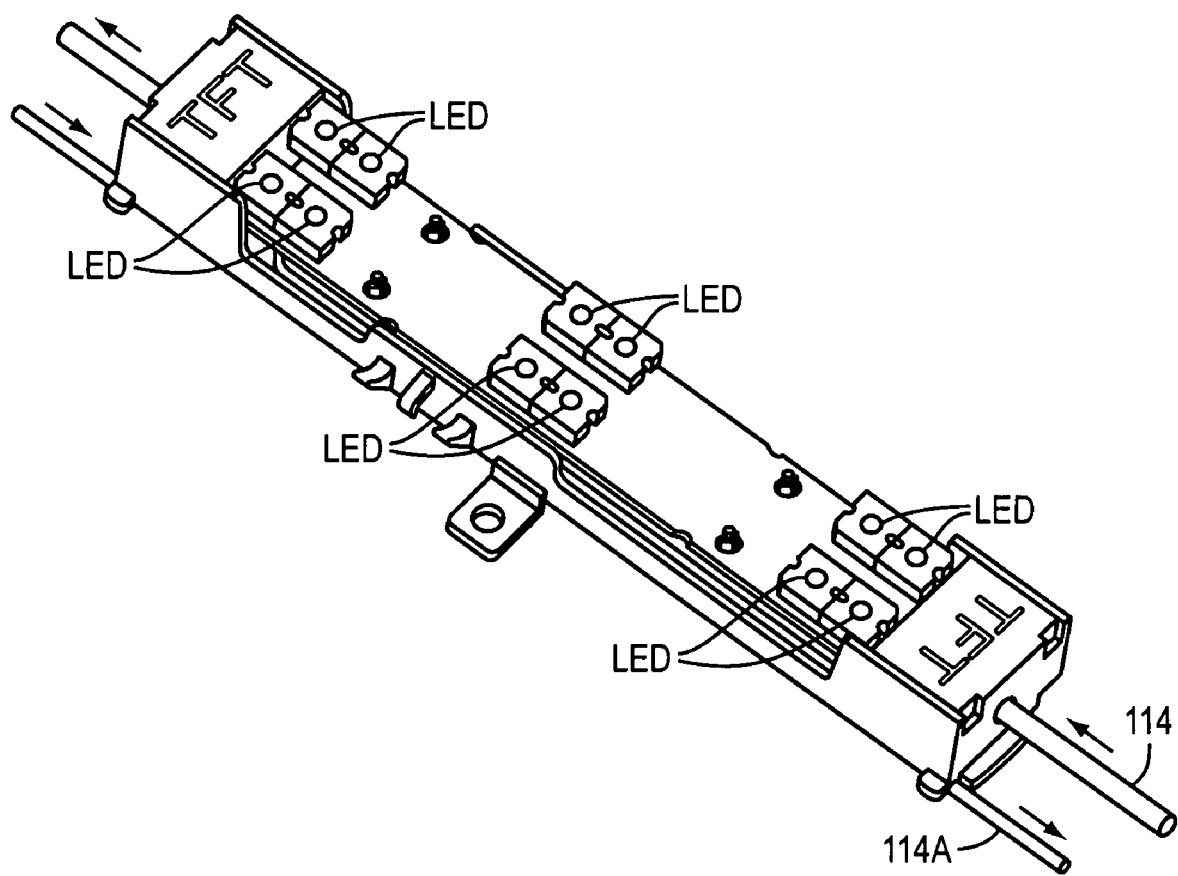
FIG. 8A is a perspective view of an illumination module.

FIG. 8A is a perspective view of an illumination module. The individual LEDs are mounted to provide a selected illumination angle (viewing angle) of the emitted light. Coupling element 232 is located inside the illumination module and wire 114 is threaded through the body of the module for contactless energy coupling. In some circular letter channels (as shown in FIG. 4), wire 114 is looped around back to the power supply (i.e., there is no return wire 114A). In some linear letter channels (e.g., letter "I"), wire 114 is threaded through the module for contactless energy transfer and than the same wire provides the return (i.e., shown as the wire 114A) nested next to the module, as shown in FIG. 8A. The LEDs may be mounted closer together for increased brightness. The current provided to LED may be automatically controlled by a microcontroller.

Figure 9:
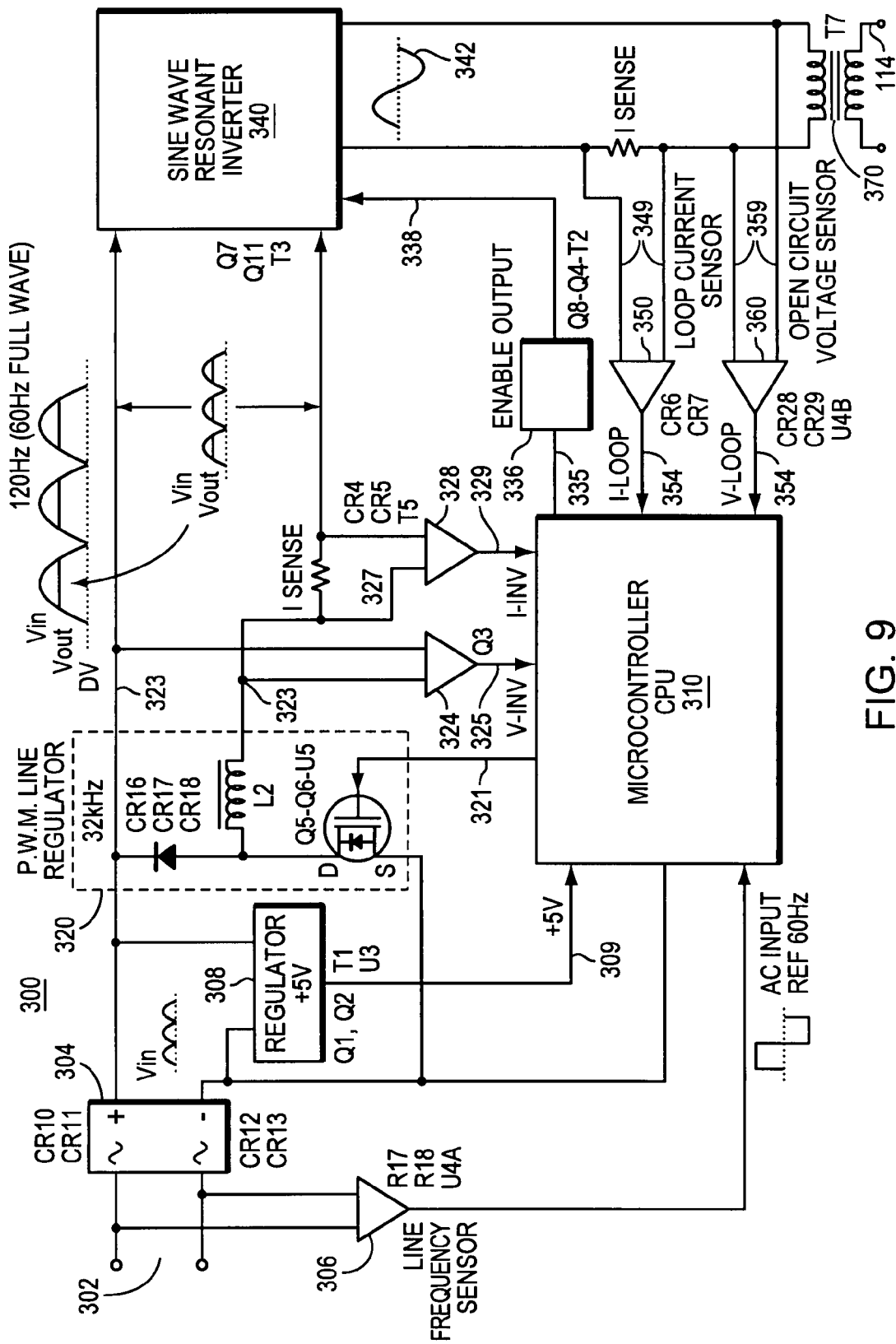
FIG. 9 illustrates diagrammatically another embodiment of a high frequency power supply for use in an illumination system.

FIG. 9 illustrates diagrammatically a high frequency power supply 300. HF power supply 300 includes an AC to DC converter 304, a line frequency sensor 306, a regulator 308, a pulse width modulator (PWM) line regulator 320, and a microcontroller 310 receiving a voltage feedback 325 and a current feedback 329. P.W.M. line regulator 320 operates at 32 kHz and provides output to a current fed resonant inverter 340. Sine wave resonant inverter 340 receives an enable output 338 from microcontroller 310, and resonant inverter 340 provides a 16 kHz sinusoidal output 342 to the current source. A current sensor 350 is arranged in a feedback loop to provide an input to microcontroller 310 (MC68HC908QY4 made by Motorola Inc.). Furthermore, an open circuit voltage sensor 360 is connected across the output from resonant inverter 340 to signal open circuit condition to microcontroller 310. The AC current source provides a sinusoidal output to current loop 114 via a transformer 370. Microcontroller 310 controls by software the maximum power output, the maximum output voltage, the loop current and/or other parameters of the power supply 300. Microcontroller 310 also registers the fault conditions of the illumination system and adjusts accordingly the voltage or current provided.

FIGS. 10, 10A, 10B, 10C and 10D show a schematic diagram of the high frequency power supply 300. The 110V AC power input is provided to four SMA controlled avalanche rectifiers CR4, CR5, CR6, and CR7. Regulator 308 (shown in FIG. 10B) includes two (2) NPN switching transistors Q1 and Q2 (MMBT3904 made by Philips Semiconductors), a transformer T1 and a low-power low-dropout linear regulator U3 (TPS76050 made by Texas Instruments).

Figure 10D:
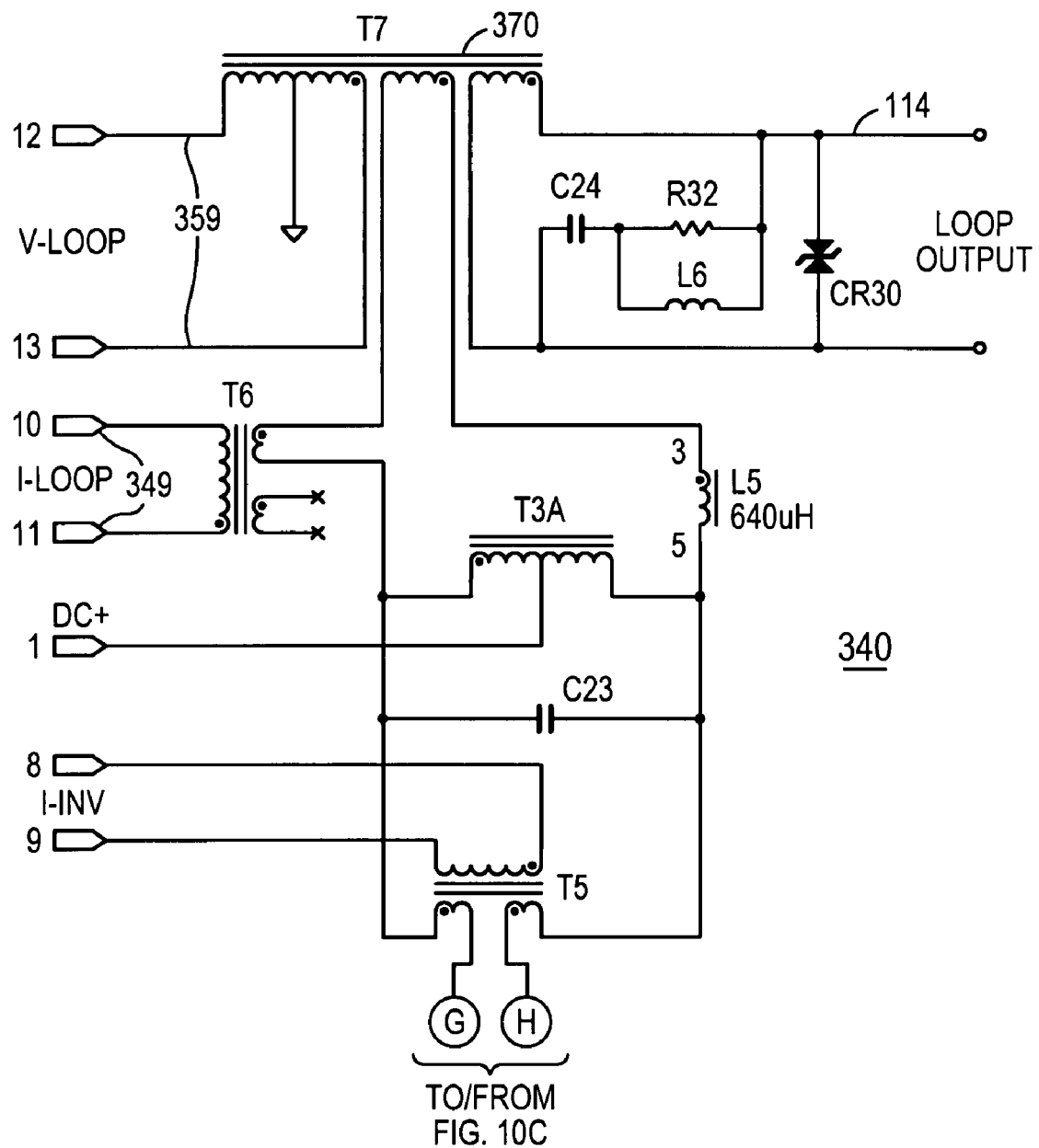

Referring to FIG. 10C, resonant inverter 340 has a sinusoidal resonant circuit topology that includes four PNP transistors Q7, Q9 Q10 and Q11 (MMBT4403). In resonant inverter 340, two pairs of transistors (Q9-Q11 and Q7-Q10) are connected so that in each pair the emitter of the first transistor drives the base of the second transistor (i.e., a Darlington pair). These two pairs are turned ON and OFF via transformer T4 to provide an oscillating current at a high current gain. The 16 kHz output is provided to transformer T7 and to current sensor 350 and open circuit voltage sensor 360, as shown in FIG. 10D.

While the present invention has been described with reference to the above embodiments and the enclosed drawings, the invention is by no means limited to these embodiments. The present invention also includes any modifications or equivalents within the scope of the following claims.

What is claimed is:

1. An illumination system, comprising:
    a master power supply constructed and arranged to generate high-frequency and low-voltage electrical power provided to a primary wire forming a current loop; and
    an illumination module including an electromagnetic coupling element and several light emitting diodes (LEDs), said electromagnetic coupling element including a magnetic core arranged to receive said current loop, and a secondary wire wound around at least a portion of said magnetic core to enable inductive coupling from said primary wire, said secondary wire being connected to provide current to said LEDs.

2. The illumination system of claim 1 wherein said magnetic core and a part of said secondary wire wound around said core are encapsulated, thereby sealing said core and wire portion while enabling displacement of said primary wire with respect to said encapsulated magnetic core.

3. The illumination system of claim 1 wherein said magnetic core is ring-shaped, and wherein said secondary wire is wound around at least a portion of said ring-shaped core.

4. The illumination system of claim 3 wherein said primary wire is threaded through an opening in said ring-shaped core.

5. The illumination system of claim 4 wherein said light emitting diodes are connected in series.

6. The illumination system of claim 1 wherein said magnetic core has a rectangular shape, and wherein said secondary wire is wound around at least a portion of said rectangularly-shaped core.

7. The illumination system of claim 6 wherein said primary wire is threaded through an opening in said rectangularly-shaped core.

8. The illumination system of claim 7 wherein said light emitting diodes are connected in series.

9. The illumination system of claim 1 wherein said magnetic core is shaped to include a closed magnetic path, and wherein said secondary wire is wound around at least a portion of said core to provide electromagnetic coupling.

10. The illumination system of claim 9 wherein said primary wire is located inside said core and arranged to provide electromagnetic coupling.

11. The illumination system of claim 10 wherein said light emitting diodes are connected in series.

12. The illumination system of claim 1 wherein said master power supply includes a resonant inverter.

13. The illumination system of claim 12 wherein said resonant inverter providing an output in the range of about 20 kHz to about 40 kHz 14. The illumination system of claim 1 wherein said master power supply includes a resonant inverter, and an AC current source.

15. The illumination system of claim 1 wherein said master power supply includes a self-oscillating inverter providing substantially a sine wave output.

16. The illumination system of claim 1 wherein said magnetic core forms a closed magnetic loop formed by two or more ferromagnetic elements.

17. The illumination system of claim 16 wherein said ferromagnetic elements are movable to enable positioning of a primary wire inside said closed magnetic loop.

18. The illumination system of claim 17 wherein a part of said secondary wire wound around said portion of said magnetic core and said portion are encapsulated.

19. The illumination system of claim 1 wherein said master power supply includes a power factor corrector.

20. The illumination system of claim 1 wherein said master power supply includes a pulse width modulation line regulator.

21. The illumination system of claim 1 wherein said master power supply includes a loop current sensor and an open circuit voltage sensor.

22. The illumination system of claim 1 wherein said master power supply includes a microcontroller for controlling a loop current and max power.

23. The illumination system of claim 1 wherein said LEDs are used for building or pathway lighting purposes.

24. An illumination method, comprising:
provide high-frequency and low-voltage electrical power;
providing said high-frequency and low-voltage electrical power to a primary wire forming a current loop;
coupling energy from said current loop in a contactless manner to a secondary wire; and
delivering current from said secondary wire to several light emitting diodes (LEDs).

25. The illumination method of claim 24 wherein said coupling includes providing a magnetic core, and a part of said secondary wire is wound around a portion said magnetic core are encapsulated thereby facilitating inductive energy coupling from said primary wire to said secondary wire.

26. The illumination method of claim 24 comprising controlling said high-frequency and low-voltage electrical power.

27. The illumination method of claim 26 comprising sensing a loop current by monitoring output of said high-frequency and low-voltage electrical signal.

28. The illumination method of claim 26, comprising sensing an open voltage current.

29. The illumination method of claim 25 wherein providing said magnetic core includes providing a ring-shaped magnetic core.

30. The illumination method of claim 25 wherein providing said magnetic core includes providing a rectangular-shaped magnetic core.

31. The illumination method of claim 25 wherein providing said magnetic core includes providing two or more ferromagnetic elements forming a closed magnetic loop.

32. For use in an illumination system, an electromagnetic coupling element constructed to couple inductively power from a power supply to one or multiple light sources, said coupling element comprising:
a magnetic core;
a source wire wound around at least a portion of said magnetic core and being connected to at least one light source;
a casing surrounding said magnetic core and said source wire at said portion being wound around said magnetic core to electrically insulate said source wire and said magnetic core; and
an inductive region defined by said magnetic core and arranged to receive a conductor in a removable arrangement with respect to said magnetic core, said conductor being located to couple inductively power from a power supply to said source wire.

33. The electromagnetic coupling element of claim 32 wherein said magnetic core is made of a ferromagnetic material that forms a closed magnetic loop.

34. The electromagnetic coupling element of claim 32 wherein said magnetic core forms a closed magnetic loop formed by two or more ferromagnetic elements.

35. The electromagnetic coupling element of claim 34 wherein said ferromagnetic elements are movable to enable positioning of said conductor inside said closed magnetic loop.

36. An installation method for coupling one or several illumination modules to a power supply, comprising:
providing illumination system comprising a master power supply constructed and arranged to provide electrical power to a primary wire forming a current loop; and an illumination module including an electromagnetic coupling element and several light sources, said electromagnetic coupling element including a ferromagnetic core;
positioning one or multiple said illumination modules constructed to provide light; and
positioning said primary wire in a close proximity to said illumination module without establishing an electrical connection, said positioning enabling inductive power transfer from said primary wire to a secondary wire wound around at least a portion of said ferromagnetic core, wherein said secondary wire is connected to provide current to one or multiple light sources.

37. The installation method of claim 36, wherein said positioning of said one or multiple illumination modules includes positioning said modules inside a letter channel.

38. The installation method of claim 36 wherein said positioning one or multiple illumination modules includes providing a magnetic core, and a part of said secondary wire is wound around a portion said magnetic core being encapsulated thereby facilitating said inductive power transfer from said primary wire to said secondary wire.

39. The installation method of claim 38 wherein providing said magnetic core includes providing a ring-shaped magnetic core.

40. The installation method of claim 38 wherein providing said magnetic core includes providing a rectangular-shaped magnetic core.

41. The installation method of claim 38 wherein providing said magnetic core includes providing two or more ferromagnetic elements forming a closed magnetic loop.

* * * * *